United States Patent
Mcdougall et al.

(10) Patent No.: US 11,246,023 B2
(45) Date of Patent: Feb. 8, 2022

(54) LOCATION-BASED RISK ALERTS

(71) Applicant: ACCENTURE GLOBAL SOLUTIONS LIMITED, Dublin (IE)

(72) Inventors: Anthony Peter Mcdougall, Collector (AU); Michael John Simmons, Weetangera (AU)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 0 days.

(21) Appl. No.: 17/147,106

(22) Filed: Jan. 12, 2021

(65) Prior Publication Data

US 2021/0258756 A1 Aug. 19, 2021

Related U.S. Application Data

(60) Provisional application No. 62/988,119, filed on Mar. 11, 2020, provisional application No. 62/978,575, filed on Feb. 19, 2020.

(51) Int. Cl.
*H04W 4/90* (2018.01)
*H04W 4/029* (2018.01)

(52) U.S. Cl.
CPC ............. *H04W 4/90* (2018.02); *H04W 4/029* (2018.02)

(58) Field of Classification Search
CPC ................................ H04W 4/90; H04W 4/029

USPC ....................................................... 455/404.2
See application file for complete search history.

(56) References Cited

U.S. PATENT DOCUMENTS

| | | |
|---|---|---|
| 2005/0197775 A1 | 9/2005 | Smith |
| 2009/0029672 A1 | 1/2009 | Manz |
| 2012/0064910 A1 | 3/2012 | Cornett et al. |
| 2015/0025917 A1* | 1/2015 | Stempora ............. G06K 9/0061 705/4 |
| 2015/0161867 A1 | 6/2015 | Bell et al. |
| 2016/0117466 A1* | 4/2016 | Singh ................... G06Q 50/265 702/19 |

* cited by examiner

*Primary Examiner* — Ted M Wang
(74) *Attorney, Agent, or Firm* — Mannava & Kang, P.C.

(57) ABSTRACT

A location-based risk alerting system is disclosed. When information regarding a risk assessment situation is received, the location and time attributes of the risk assessment situation are extracted, a risk score is calculated and a risk alert is generated to include the attributes and the risk score upon validating the received information for risk. The risk alert is transmitted to client devices of subscribers where a user-specific risk score is calculated at each client device based on a comparison of the distance of the client device from the location attribute and the time at which the risk alert is received with the time attribute. The risk alert is displayed at the client device based on the user-specific risk score and information regarding the user is shared with trusted authorities upon receiving user consent.

20 Claims, 16 Drawing Sheets

US 11,246,023 B2

LOCATION-BASED RISK ALERTS

PRIORITY

This application is a non-provisional application of the U.S. provisional patent application bearing the Ser. No. 62/978,575, entitled "Utilizing Machine Learning To Determine Risk Scores For Individuals Based On Geographical Locations And Movements Of The Individuals", filed on Feb. 19, 2020, and the U.S. provisional patent application bearing the Ser. No. 62/988,119, entitled "Utilizing Machine Learning To Determine Risk Scores For Individuals Based On Geographical Locations And Movements Of The Individuals", filed on Mar. 11, 2020, the entireties of these U.S. provisional patent applications are incorporated herein by reference.

BACKGROUND

Situations such as natural disasters, terrorist attacks, epidemics, etc., occurring around the globe in different countries provide risky environments for residents of those countries and visitors traveling to those countries. For example, some countries recently banned travel to China and have closed borders to people who traveled through China due to the outbreak of the coronavirus. Measures such as travel bans or closing borders to the flow of people and goods have massive global economic impacts. Determining risks associated with the aforementioned situations is very subjective, and current risk assessment techniques lack precision. For example, some governments are defining risks for people entering countries based on whether the people traveled to a very large location (e.g., China) over longer periods (e.g., two to three weeks). Thus, current risk assessment techniques are ineffective and waste computing resources (e.g., processing resources, memory resources, communication resources, and/or the like), networking resources, by failing to accurately determine risks for individuals, implementing border policies based on inaccurately determined risks. As a result, resource utilization is not optimized, for example, redundant services may be provided or, emergency services may not be provided where necessary, and/or the like.

BRIEF DESCRIPTION OF DRAWINGS

Features of the present disclosure are illustrated by way of examples shown in the following figures. In the following figures, like numerals indicate like elements, in which.

DETAILED DESCRIPTION

Figure 1:
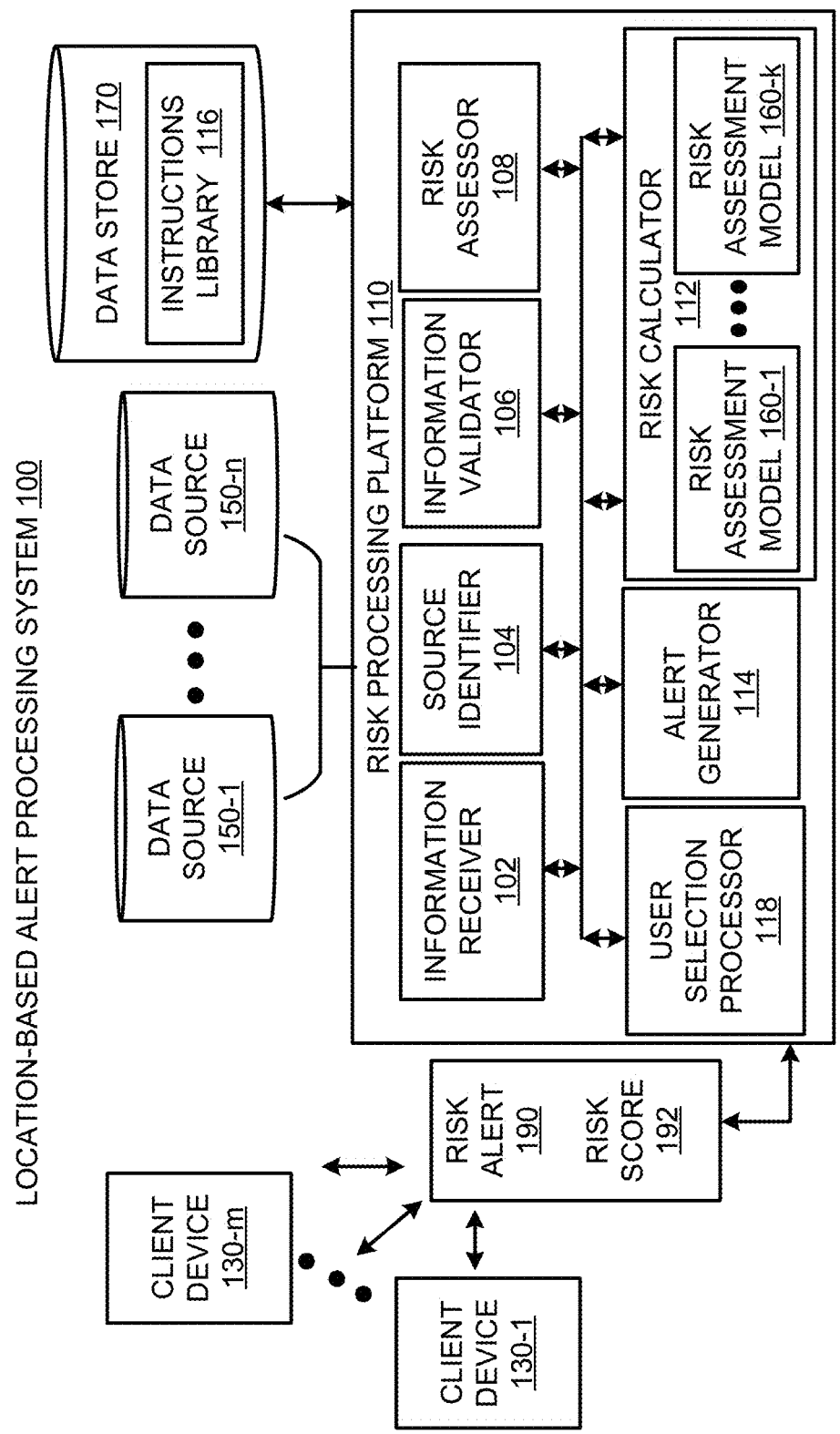
FIG. 1 shows a block diagram of a location-based alert processing system in accordance with the examples disclosed herein.

For simplicity and illustrative purposes, the present disclosure is described by referring to examples thereof. In the following description, numerous specific details are set forth in order to provide a thorough understanding of the present disclosure. It will be readily apparent however that the present disclosure may be practiced without limitation to these specific details. In other instances, some methods and structures have not been described in detail so as not to unnecessarily obscure the present disclosure. Throughout the present disclosure, the terms "a" and "an" are intended to denote at least one of a particular element. As used herein, the term "includes" means includes but not limited to, the term "including" means including but not limited to. The term "based on" means based at least in part on.

A location-based alert processing system that generates and processes risk alerts related to situations that warrant risk assessments is disclosed. The alerts processing system includes a risk processing server or a risk processing platform that receives information regarding a risk assessment situation from one or more of a plurality of data sources, determines the authenticity of the received information, and alerts users regarding risky situations. The alerts processing system, therefore, processes risk, which includes the likelihood of physical or another kind of damage that can occur to users, people connected with the users, or material possessions associated with the users at a given geographical locale due to specific situations. The risk processing server can determine the authenticity of the received information based on whether the information has been received from trusted data sources or by verifying the received information from multiple data sources of the plurality of data sources. If the received information is determined to be valid, a risk score is determined based at least on the severity of the risky situation and the timing associated with the risky situation. For example, the risk score can be determined by a selected one or more of a plurality of machine learning (ML) based risk assessment models that are trained in generating the risk scores for different risk assessment situations. The risk score can indicate the likelihood of damage or risk to users who may be present in the geographic location associated with the risky scenario or who may be traveling to that geographic location. A risk alert including the location attribute corresponding to the specific location at which the risky situation is present and a temporal or time-related attribute associated with the risky situation along with the risk score is generated. The risk alert is transmitted to client devices registered by users with the alert processing system to receive location-based risk alerts.

When the risk alert is received at a client device of a registered user, the location attribute, the time-related attribute, and the risk score are initially extracted. A user-specific risk score is calculated based on a comparison of the user's location data stored on the client device with the location attribute of the risk alert and a comparison of the temporal data of the client device with the time-related attribute of the risk alert. In an example, the risk score of the risk alert can be weighed per the factors proportional to the differences obtained based on the location and time data comparisons. The corresponding user-specific risk score of the client device can be compared to a predetermined risk threshold in order to determine if the risk alert is relevant to the user associated with the client device. Based on the comparison with the predetermined risk threshold, the risk alert may be displayed or may not be displayed on the client device.

The risk alert can be displayed along with the user-specific risk score and a feedback mechanism that can receive input regarding further user action. Furthermore, suggestions for handling the risk based on the severity of the risk can be provided by the risk alert. The user-specific risk score can be mapped to a plurality of risk levels. Each risk level characterizes the severity of the risk to the user and provides suggestions regarding the information that should be shared in order that the user may receive adequate assistance to handle the risk. The suggestions balance the need of the user to share the information versus the user's privacy. Risk levels associated with a higher risk may suggest sharing a greater amount of user data to receive the requisite help needed for the user to handle the emergency.

The location-based alert processing system as disclosed herein provides for a technical improvement in the field of emergency alert processing by balancing the requirements for user data sharing for providing the users with assistance with the need for users' privacy. The alert processing system, therefore, puts the data sharing control in the hands of citizens by providing them with instant access to vital information that can assist the citizens in containing, treating, and mitigating risks as soon as they are identified. With risks spreading faster thereby resulting in increasing severity of impacts, the alert processing system enables providing targeted assistance based on personalized needs. The alert processing system allows for personalized risk treatment plans which can be instantly distributed to all citizens within an impacted risk area, without the need for accessing any personal data. The result is that treatment can be applied immediately, and puts the power to solve the issues in the hands of the individual. The alert processing system as described herein mitigates the need for a central database or state-based requests for data to protect citizens as it starts with pushing areas of risk, such that the citizens can be in control of the treatment, and not a state-based collection of data. The alert processing system maintains transparency on how it is contacting those at risk based on current and historic locations. Sensitive data remains with the citizens on their own client devices and is not required to be stored in a large centralized data store. The individual risk is calculated at the client devices based on corresponding user locations and may only be shared at the users' discretion with their trusted sources to support treatment. Once enabled on the client devices, the alerts will be provided to citizens' devices so their device can determine if it was in the area at the time, and then through user consent, start a treatment plan. This enables a notification and treatment model where the citizen can choose the course of action, with a process that is supportive of treating the risk.

FIG. 1 shows a block diagram of a location-based alert processing system 100 in accordance with the examples disclosed herein. The alert processing system 100 includes a risk processing platform 110 that communicates with a plurality of client devices 130a, . . . , 130m (where 'm' is a natural number and 'm' is greater than or equal to 1) associated with users who are registered with the location-based risk processing platform 110 to receive alerts regarding risks associated with different risk assessment situations. In some examples, the risk assessment situations can include emergencies such as extreme weather conditions including storms, heat waves, etc., natural disasters such as earthquakes, landslides, health-based emergencies such as epidemics, or law and order-based emergencies such as riots, active-shooter situations, etc., or man-made disasters such as bombings, missile strikes, etc. In some examples, the risk assessment situation can include assessing risk for one or more specific geographic locales that may be requested by one of the registered users. The risk assessment can be provided by the alert processing system 100 in the form of a risk score 192 which is indicative of the risks that may be encountered by the users, based on the locations of the users and/or the movements of the users relative to the location associated with the risk assessment situation. For example, a user visiting or living in a city with a higher crime rate may be assigned a greater risk score than a user visiting or living in a city with a lower crime rate.

The risk processing platform 110 can be connected to a plurality of data sources 150a, . . . , 150n (where 'n' is a natural number and 'n' is greater than or equal to 1) such as government data sources, news sources, social media, or even the plurality of client devices 130a, . . . , 130m. Information regarding a risk assessment situation, such as one of the emergencies described above is received from one or more of the plurality of data sources 150a, . . . , 150n, by an information receiver 102 included in the risk processing platform 110 is initially provided to a source identifier 104 also included in the risk processing platform 110. The source identifier 104 determines if the emergency information is received from a trusted data source. For example, a subset of the plurality of data sources which include remote data sources such as government data sources or subscription data sources, etc., can be treated by the risk processing platform 110 as trusted data sources so that the emergency information from such data sources is automatically processed for alert generation. Alternately the trusted data sources can create alerts that are stored in a central store which can be based on externally sourced data such as weather alerts, health-based manual contact tracing collected from external data providers, emergency response alerts, etc. This information is curated and includes alert details and is either associated with a unique identifier (business code location/zone) or a spatial area through a point, polygon, etc. These are stored in the central store and are made available through a distributed secure internet cache for scale and performance, which can be securely accessed through Application Programming Interfaces (APIs) of the associated devices. However, if the emergency information is received from an unverified data source such as one of the client devices 130-1, ..., 130-m, then such information can be provided to an information validator 106 to determine the validity of the information. In an example, the information validator 106 may provide the received information to a human reviewer who may verify the received information with information from one of the trusted data sources before allowing the information to be processed for alert generation.

A risk assessor 108, also a part of the risk processing platform 110, analyzes the information to extract data such as the location(s) associated with the risk assessment situation such as an emergency as described herein. The risk assessor 108 further determines the temporal attributes of the emergency. For example, the temporal attributes can be determined based on whether the emergency is a current occurrence or a predicted occurrence. In an example, the risk assessor 108 can include natural language processing (NLP) components that parse, tokenize and analyze the tokens from the messages received from one or more of the data sources 150-1, ..., 150-n to determine the location and the temporal attributes of the emergency by extracting keywords pertaining to the type of risk assessment situations, the names of different locations and timings. For example, a message that includes words such as "fire", "burning", etc., enable the risk assessor 108 to determine that the received information relates to fire and keywords such as "now" or "current", etc., cause the risk assessor 108 to determine that the emergency is a current occurrence. If the message includes words indicating future time points, such as "predicted", "will occur", "forecast", or future time ranges, the risk assessor 108 determines that the emergency is a future occurrence. Also, the risk assessor 108 can extract other attributes based on the type of emergency. For example, if the emergency pertains to a storm, the risk assessor 108 can analyze the received information for characteristics of the storm such as the storm category, the wind speed, the temperatures, the time at which the storm may reach specific geographic locations, etc. Similarly, other situation-specific information can be extracted by the risk assessor 108. Again, it can be appreciated that the risk assessor 108 upon receiving the information regarding the emergency from one of the data sources 150-1, ..., 150-n can be configured to search for similar information from other data sources of the plurality of 150-1, ..., 150-n, not only for verification but also to maximize the information available regarding the emergency.

The information extracted by the risk assessor 108 from one or more of the plurality of data sources 150-1, ..., 150-n is provided to a risk calculator 112 which includes one or more ML-based trained risk assessment models 160-1, ..., 160-k (where 'k' is a natural number and 'k' is greater than or equal to 1), that provide a risk score associated with the emergency. Different risk assessment models can be employed to produce risk scores for different risk assessment situations. For example, a risk assessment model 160-1 may be employed to generate a risk score for a snowstorm whereas another risk assessment model 160-2 can be employed for generating a risk score for an emergency such as a forest fire. Based on the information regarding the type of risk assessment situation obtained from the risk assessor 108, the risk calculator 112 selects at least one of the trained risk assessment models 160-1, ..., 160-k, to obtain the risk score 192. If more than one risk assessment model is selected then the risk score 192 can be an average or weighted average of the partial risk scores generated by each of the selected risk assessment models. Each of the plurality of risk assessment models can be trained on historical data (e.g., historical location data, historical movement data, and historical event data) to determine risk scores for users associated with the historical data. In an example, the risk calculator 112 can implement feedback so that user selections of proposed solutions or suggested actions for a given alert can be used to adjust the corresponding risk assessment model.

The risk score 192 thus generated is provided to an alert generator 114 that generates a risk alert 190 to include the attributes extracted by the risk assessor 108 and the risk score generated by the risk calculator 112. The alert generator 114 can be configured to allow administrative users generating alerts to define an area of concern and allow for modeling and verification of people that have responded as being safe as a result of the information provided by the alert processing system 100. The alert generator 114 therefore can generate alerts that summarize information from multiple ones of the plurality of data sources 150-1, ..., 150-n. Therefore, the risk processing platform 110 includes more functionality than mere data entry of alerts that simply push information from one system to another. Furthermore, the alert generator can have the option to receive a count from the users as to how many acknowledged real-time, compared to the number of counts expected in the alert creation stage. Such details can be reviewed and one or more attributes of the alert, such as the location attribute, the risk score 192, the temporal attribute, etc., can be altered accordingly and an updated alert may be generated for approval and publication.

Furthermore, the alert generator 114 can access preconfigured risk-handling instructions to be included in the risk alert 190. For example, the alert generator 114 can extract the instructions from an instructions library 116 which may be stored in a data store 170 communicatively coupled to the risk processing platform 110. The instructions library 116 can include steps that the user can take to maximize protection and minimize damage in case of a specific emergency. The emergency instructions can also further include emergency contact numbers that the user can call or help/response centers that the user can visit for assistance during the emergency. The risk alert 190 thus generated to include the location attributes can be transmitted to the client devices 130a, ..., 130m to be displayed on a user interface (UI) associated with a risk processing 'app' installed on the client devices 130a, ..., 130m.

The risk processing app can include a feedback mechanism coupled to the instructions for handling the emergency. The feedback mechanism can provide one or more user-selectable options that cause the risk processing platform 110 to execute further actions. For example, the selection of one of the options can cause transmission of certain user-specific data such as the current location of the client device to the risk processing platform 110. In an implementation, the user-specific data which is shared is used only for that particular interaction or for handling the particular emergency related to the risk alert 190. Upon resolving the emergency related to the risk alert 190 the data shared by the user can be deleted from the risk processing platform 110 so that the next time the user is responding to another alert, the user has to again opt-in to share specific data based on the corresponding recommendations. The alert processing system 100 therefore balances users' safety with users' privacy concerns.

In response to receiving a user's selection of further action to be executed, the user selection processor 118 included in the risk processing platform 110 can execute different functions such as updating one or more of the plurality of trained risk assessment models 160-1, ..., 160-k, employed to generate the risk scores and optionally the updating the risk score in the risk alert 190 which in turn may change the users who will see the risk alert 190 on their client devices, providing management instructions or suggestions for handling the emergency, etc. In an example, the user selected option can cause the client device to execute the action without input from the risk processing platform 110. For example, if the user selects an emergency response center, the risk processing app can invoke a mapping application to display a route from the current location of the client device to the emergency response center.

While the examples are discussed above primarily refer to the generation of alerts in response to different emergencies, it can be appreciated that this is not necessary. Similar analysis with the generation of a risk alert including a risk score can also be executed by the risk processing platform 110 in response to a user request. For example, if the user is traveling to one or more locations, the user may provide the travel itinerary and the risk processing platform 110 provides a risk alert including a risk score that assesses various risks associated with the user's travel plans. Such risk scores can be assessed using multiple ones of the plurality of ML-based risk assessment models 160-1, ..., 160-k, for different risks such as bad weather, crime at the user's destination(s), risk of disease (e.g., pandemic), etc. The risk alert thus generated can include separate risk scores for each of these risk factors and an aggregated risk score for the entire trip including all the factors that were considered.

Figure 2:
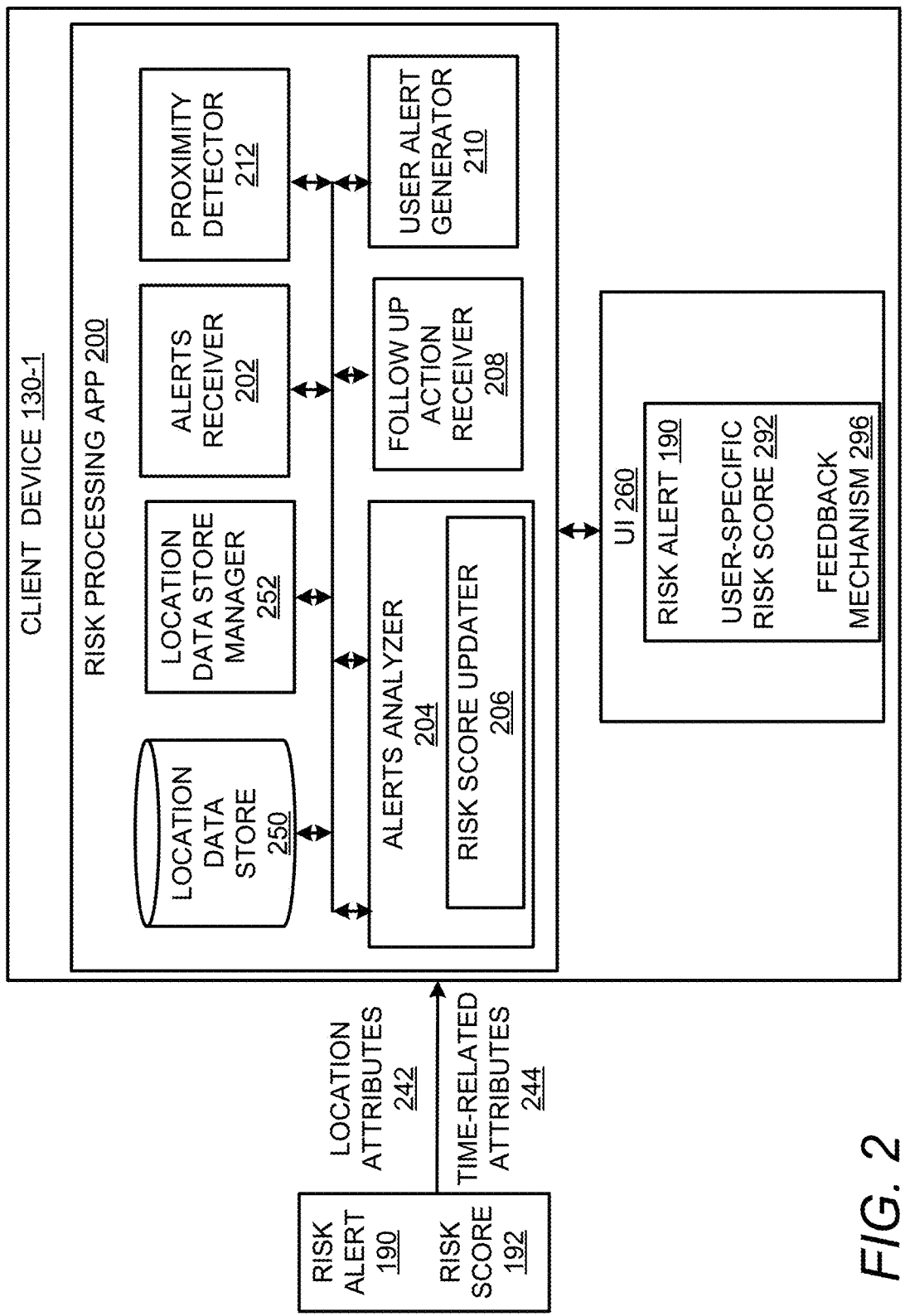
FIG. 2 shows a block diagram of a risk processing app executed by client devices in accordance with the examples disclosed herein.

FIG. 2 shows a block diagram of the risk processing app 200 executed, for example, by the client device 130-1 in accordance with the examples disclosed herein. The risk processing app 200 includes a location data store 250 and various processor-readable instructions modules including a location data store manager 252, an alerts receiver 202, an alerts analyzer 204, a risk score updater 206, a follow-up action receiver 208, and a user alert generator 210. The location data store 250 can include a database, a table, a flat-file, etc. The location data store manager 252 can be configured to store location data of the client device 130-1 for a preconfigured period e.g., a week, a fortnight, etc. in the location data store 250. The location data can include data identifying Global Navigation Satellite System (GNSS) coordinates and/or the visual position system (VPS) coordinates associated with the client device 130-1, locations identified via explicit input from users to the client device 130-1, current locations of the client device 130-1, etc. When the preconfigured period expires, the location data store manager 252 can be configured to delete the stored location data to store newer location data. In some examples, the user may opt-in to provide the location data and/or their movement data to the risk processing platform 110. The location data store manager 252 is configured to provide the location/movement data of the client device 130-1 only upon explicit consent from the users. The users can control the type of data and the times at which the data is provided to the risk processing platform 110. The location data store 250 stores the user's location data securely on the client device 130-1 using encryption and rotating keys only held on the client device 130-1 such that the information from the location data store 250 is not accessible with a central store/honeypot unless explicitly authorized by the user.

The risk alert 190, transmitted or issued by the risk processing platform 110 is received by the alerts receiver 202 and provided to an alerts analyzer 204 for the extraction of the alert attributes. The alerts analyzer 204 extracts the location attributes 242 and the time-related or temporal attributes 244 of the risk alert 190 in addition to other data such as the risk score 192 of the risk alert 190 and the suggestions for managing the emergency, etc. The alerts analyzer 204 employs the extracted data to determine if the risk alert 190 should be displayed to the user. The risk score 192 of the risk alert 190 can be further optimized by the risk score updater 206 to generate a user-specific risk score 292 based on various factors obtained from the local data of the client device 130-1. The user-specific risk score 292 is compared to a predetermined score threshold by the alerts analyzer 204 to determine if the alert should be displayed to the user or if the risk alert 190 should be deleted without displaying it to the user.

An example scenario can include a virus containment scenario where a person exposed to a virus or other contagious condition visits a public place such as a supermarket or a library, etc. The health authorities may send out an alert regarding the person's presence in the specific areas. On receiving the alert, each of the plurality of client devices 130-1, ..., 130-m calculates a user-specific risk based on a comparison of the stored location data with the respective timestamps of the corresponding client devices with the location and time attributes of the alert. Based on the match between the location date-time stamps of the client devices with the location and time attributes of the alert, the user-specific risk scores are obtained. Each of the user-specific risk scores is compared with a predetermined risk threshold to determine if the corresponding user is at risk. The predetermined risk threshold can be configured based on historical risk scores as obtained from the location and time data associated with vulnerable and/or infected users.

The risk alert 190 can be displayed to the user either within a UI 260 of the risk processing app 200 or within the UI of another app. User preferences and the severity of the alert can be taken into consideration to display the risk alert 190. preferences and alert severity define the device response(s). Users can be prompted once with alert tones, missed notifications can be repeated, and an escalation can be implemented as required. The escalation can include the need for a user action to confirm receipt and the user confirmation that action was taken (guaranteed delivery).

In an example, a feedback mechanism 296 can also be provided along with the risk alert 190 to enable the user to take further action which can include sharing with the risk processing platform 102, the user's data such as one or more of the user-specific risk score 292, the user's location data, the user's identification, etc. to obtain further assistance. The feedback mechanism 296 can provide a list of follow-up actions which the user can select for execution by one or more of the client device 130-1 and the risk processing platform 110. One of the follow-up actions can include the user's opt-in to share certain information such as information from the location data store 250, the user's identification information, etc., with the risk processing platform 110 for additional assistance. In an example, the user's risk score 192 can be associated with one of a plurality of risk levels which suggests if the user should share any data with an external trusted party and if yes, that particular data to be shared so that the user receives optimal assistance while persevering user privacy. In some instances, suggestions related to another's emergency alert may be received. For example, if the risk processing platform 110 receives the location of the client device 130-1, then notifications regarding assistance required by other people in the vicinity of the client device 130-1 may be transmitted. In another example, user identity information can be transmitted to the user's insurance carrier so that the user receives the required assistance.

The user alert generator 210 can be used to generate alerts for processing by the risk processing platform 110. A user who may be facing an emergency such as an extreme weather condition, a major accident involving one or more vehicles, a natural calamity, etc., can employ the user alert generator 210 for generating the alerts. The user alert generator 210 can include interfaces allowing the users to type text, take pictures or video, and/or record voice messages so that the user has multiple modalities of communication to select the most convenient communication mode to generate the alert during the emergency. In an example, the user alert generator 210 can automatically include certain user-specific data such as the user's current location, the identifying indicia of the client device, which is used to transmit the user alert, etc. In some instances, user alerts such as user-generated images of a known weather condition may be automatically published. Generally, the alerts generated by client devices can be initially provided to assist the user by employing, for example, the instructions library 116. Further, the user-generated alert(s) can be validated by human reviewers who verify the information from other, trusted data sources to generate the emergency alerts to be transmitted to all the subscribers of the alert processing system 100.

Another risk assessment tool provided by the alert processing system 100 includes a proximity detector 212 that is used during health emergencies such as pandemics. The proximity detector 212 employs short-range communication networks such as Bluetooth networks to detect the proximity of another client device which also executes the risk processing app 200. The proximity detector 212 on each of the client devices generates a random key which is provided to the other client device. The randomly generated keys are exchanged between the client devices to record proximity associated between the client devices. In an example, the randomly generated keys can be shared with a healthcare provider who can employ the keys to search a centralized database which stores a key to phone number mapping to trace contacts if a user associated with one of the client devices is infected during the health emergency. The information gathered by the proximity detector 212 can also be shared only on receiving user consent.

Figure 3:
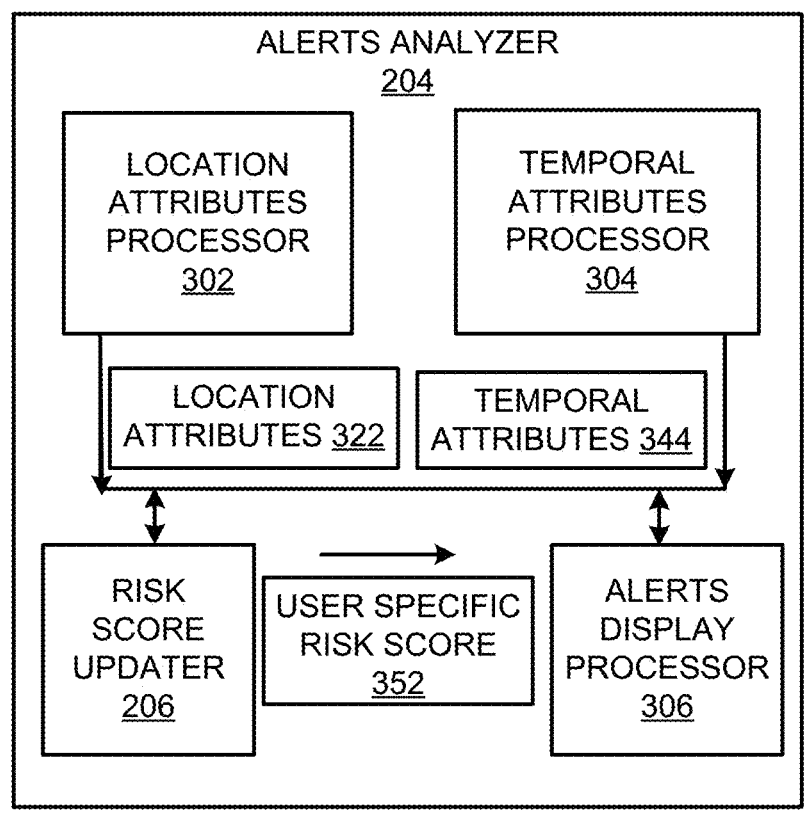
FIG. 3 shows a block diagram of an alerts analyzer in accordance with the examples disclosed herein.

FIG. 3 shows a block diagram of the alerts analyzer 204 in accordance with the examples disclosed herein. The alerts analyzer 204 includes a location attributes processor 302, a temporal attributes processor 304 and the risk score updater 206, and an alert display processor 306. The location attributes processor 302 extracts attributes of location included in the risk alert 190. As mentioned above, the location attributes 322 can include names of specific locations such as counties, specific areas of cities which may identify particular location such as airports, tourist attractions, etc. The location attributes 322 may also include Global Positioning System (GPS) coordinates of specific locations. The location attributes processor 302 can employ techniques such as named entity recognition (NER), string matching, and other text-matching techniques to obtain the location attributes 322 from the risk alert 190. The temporal attributes processor 304 extracts the time-related or temporal attributes 344 which can include timelines associated with the risk assessment situation referred to in the risk alert 190. The timelines indicate the timing of an emergency or other risky situation so that the extracted temporal attributes 344 can include the dates/times of the emergency. As mentioned above, NLP techniques can be employed by the temporal attribute processor 304 to identify explicit dates/times or extract temporal keywords such as "now", "currently", or words related to tenses "is" indicative of the timings can be included in the risk alert 190. In an example, the temporal keywords can be mapped to the corresponding date-time stamps.

The location attributes 322 and the temporal attributes 344 extracted from the risk alert, 190 employed by the risk score updater 206 to generate a user-specific risk score 352 by updating or optimizing the risk score 192. The temporal attributes 344 from the risk alert 190 are compared by the risk score updater 206 to a current date/time obtained from the client device 130-1. If the current date and time coincides with or is within a predetermined time threshold of the temporal attributes 344, the risk score 192 can be increased by a factor that is inversely proportional to the difference between the current date and time and the temporal attributes 344. If the current date and time do not coincide with or are outside the predetermined time threshold, the risk score 192 can be decreased by a factor directly proportional to the difference between the current date and time and the temporal attributes 344. Similarly, the location attributes 322 obtained from the risk alert 190 are compared with the location data stored in the location data store 250 to estimate the distance between the location attributes 322 and the location data. Again, the distance may be compared to a predetermined distance threshold and the risk score 192 which is adjusted or optimized for the time factor can be further optimized for the distance or location factor to generate the user-specific risk score 352 which is provided to the alert display processor 306. The user-specific risk score 352 is compared to a predetermined display threshold by the alert display processor 306 to determine if the risk alert 190 should be displayed on the client device 130-1. Depending on the particular display threshold configuration, a determination is made regarding whether the risk alert 190 is to be displayed or deleted without being displayed. For example, if the location of the risky situation or if the timing of the risky situation does not coincide with the location data or the timing of the client device 130-1, the risk alert 190 can be deleted without being displayed. If, however, the location of the risky situation or if the timing of the risky situation coincides with the corresponding location data or the timing of the client device 130-1, which the risk alert 190 can be displayed by the alert display processor 306 on the client device 130-1.

The various thresholds including the predetermined time threshold, the predetermined distance threshold, and the predetermined display threshold can be determined empirically based on historical data. Further, the thresholds can be adjusted in response to user selections received via the feedback mechanism 296.

Figure 4:
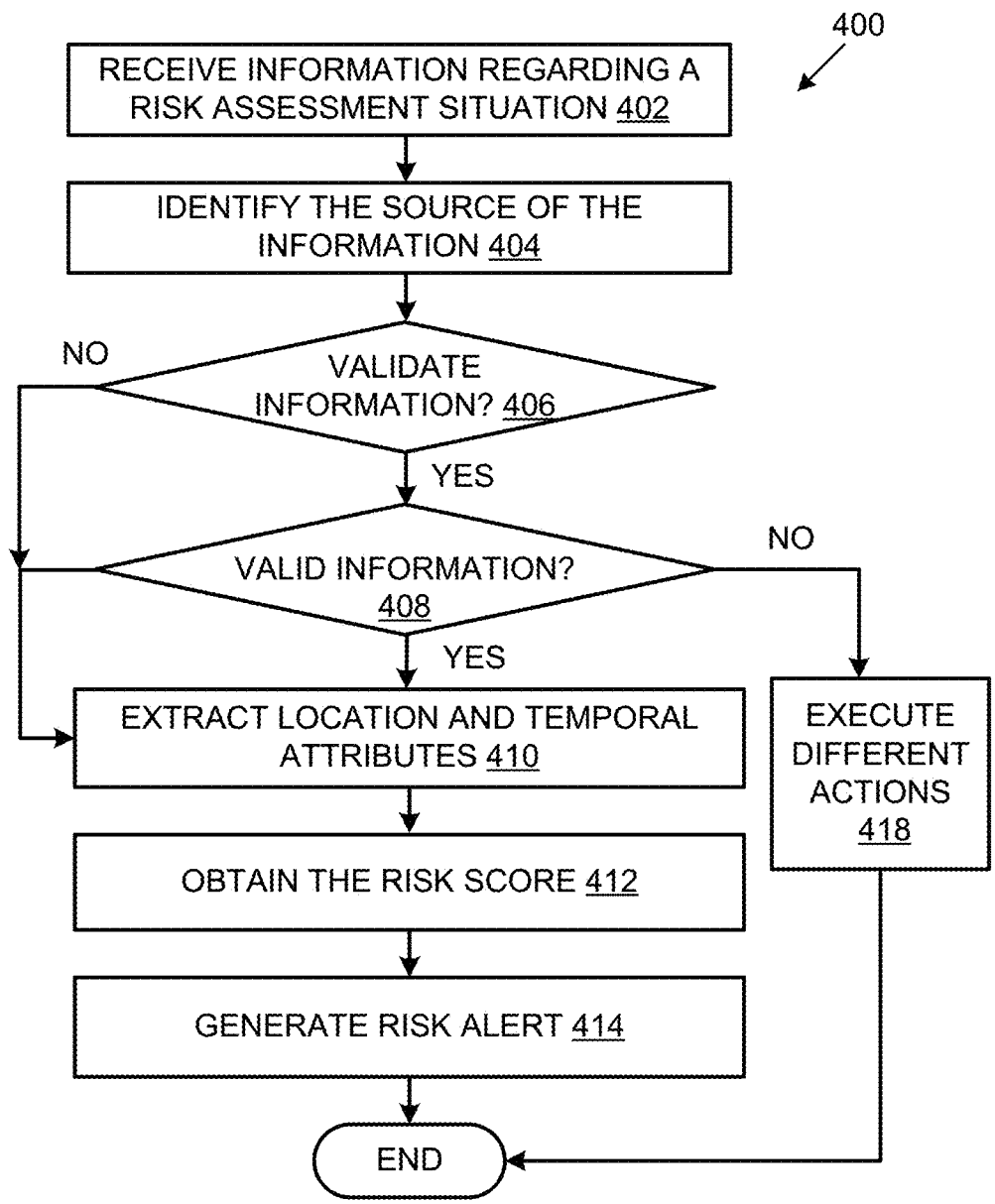
FIG. 4 shows a flowchart that details a method of processing location-based risks in accordance with examples disclosed herein.

FIG. 4 shows a flowchart 400 that details a method of processing location-based risks in accordance with examples disclosed herein. The method begins at 402 wherein information regarding a risk assessment situation is received. As mentioned above, the risk assessment situation can involve various types of emergencies or a user request for assessment of risks at one or more locations. The information can be received at 402 from the plurality of data sources 150-1, . . . , 150-n through dedicated API or other formats such as small message service (SMS), Multimedia message service (MMS), Instant Messages (IMs), etc. The source(s) providing the information is determined at 404. It is determined at 406 if the information is valid or if the information needs to be validated based on the source. If it is a trusted source, then the information can be processed directly at 410 for location attribute and temporal attribute extraction. If, however, the source is not a trusted source, the information/the source is verified/validated at 406. In an example, the information can be checked by a human reviewer with information available from other trusted data sources for validation. It is further determined at 408 if the information was found to be valid. If it is determined at 408 that the reviewer is unable to verify the information from trusted data sources, different actions may be executed at 416 depending on the type of information and the method terminates on the end block. If the information pertains to an emergency such as an accident, fire, or report of a crime, the information may be immediately passed on to the appropriate authorities. If the information pertains to a risky situation where consequences occur slowly, the information may be stored temporarily for verification from trusted sources. If it is determined that the information is received from a known spam source, the information may be deleted without further action.

If at 408, the information is found to be valid, the method moves to 410 for the location and temporal attribute extraction. At 412 the risk score 192 is obtained by feeding the received information to one or more of the plurality of ML-based risk assessment models 160-1, . . . , 160-k. A risk alert 190 is generated at 414 including the location and the temporal attributes along with the risk score 192. In an example, the risk alert, 190 can be composed of a preconfigured template selected from a plurality of templates that are preconfigured for different risk assessment scenarios. The risk alert 190 can be produced by plugging in the location and the temporal attributes at the appropriate slots in the selected preconfigured template. Furthermore, a set of instructions that a user can follow to mitigate risk, can be selected from the instructions library 116, and incorporated into the selected preconfigured template which is transmitted as the risk alert 190.

Figure 5:
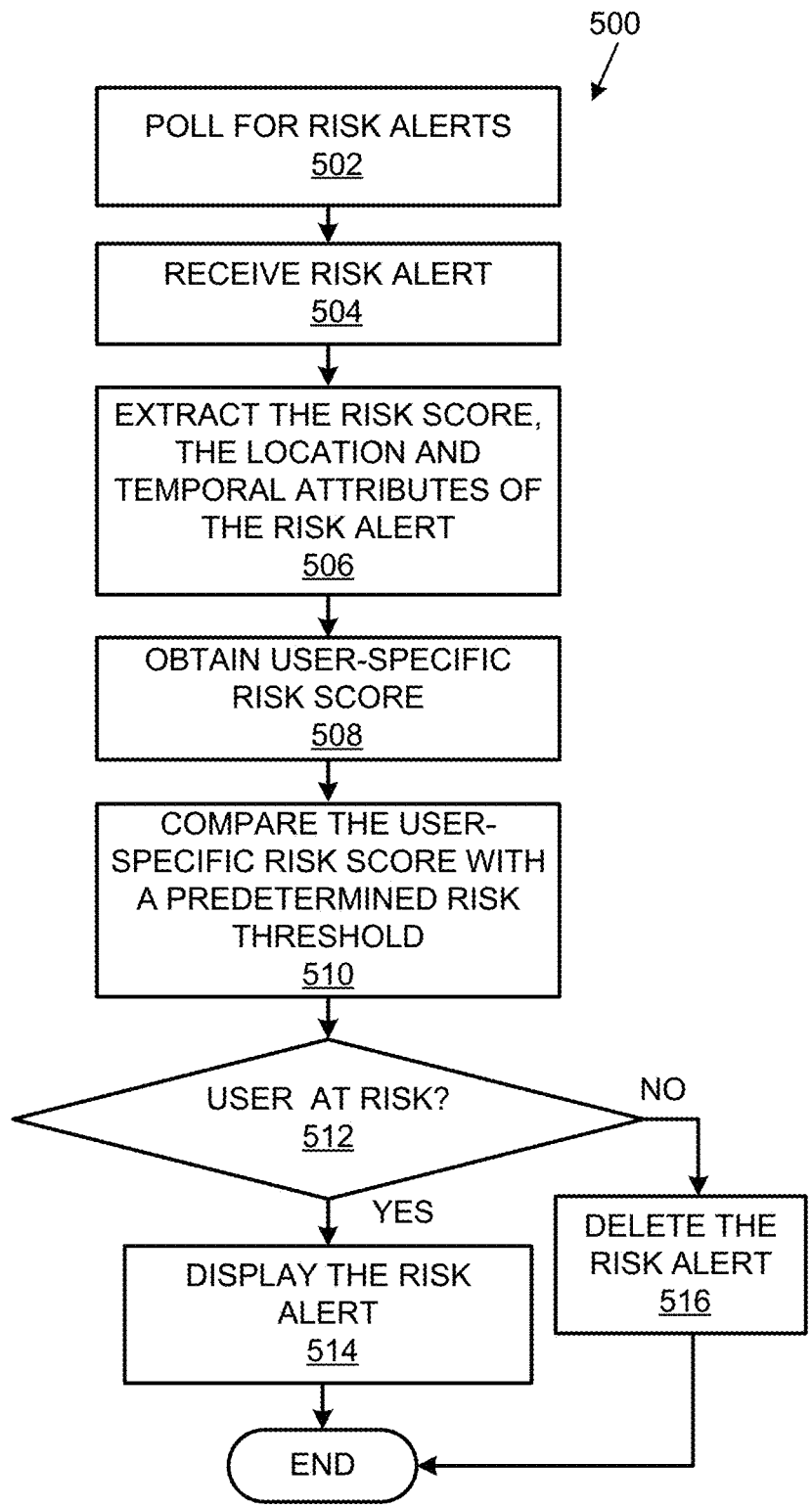
FIG. 5 shows a flowchart that details a method of processing location-based risk in accordance with examples disclosed herein.

FIG. 5 shows a flowchart 500 for processing location-based risk in accordance with examples disclosed herein. The method which may be executed by one or more of the plurality client devices 130-1, . . . , 130-m, begins at 502 wherein the client device, e.g., the client device 130-1, polls for any risk alerts. In an example, the risk processing app 200 on the client device 130-1 can be configured to poll for alerts periodically, for example, every two hours. In an example, the risk processing app 200 may also be configured with a 'refresh' icon which can be activated by a user to manually receive new alerts/updates. At 504, the risk alert 190, is received. The risk score 192, the location, and the temporal attributes of the risk alert 190 are extracted at 506. At 508, the user-specific risk score 352 is obtained. At 510, the user-specific risk score 352 is compared with the predetermined score threshold. The predetermined score threshold can be indicative of the acceptable risk for the user based on the location of the client device 130-1 in terms of distance and time from the risky location associated with the risk alert 190. Based on the comparison, it is determined at 512 if the user is likely to be at risk from the risk assessment situation (e.g., emergency) referred to in the risk alert 190. Therefore, if it is determined at 512 that the user is at risk, the risk alert 190 is displayed at 514 on the client device 130-1. If it is determined at 512 that the user is not at risk the risk alert 190 need not be displayed to the user and hence the risk alert, 190 is deleted at 516 without being displayed on the client device 130-1.

Figure 6:
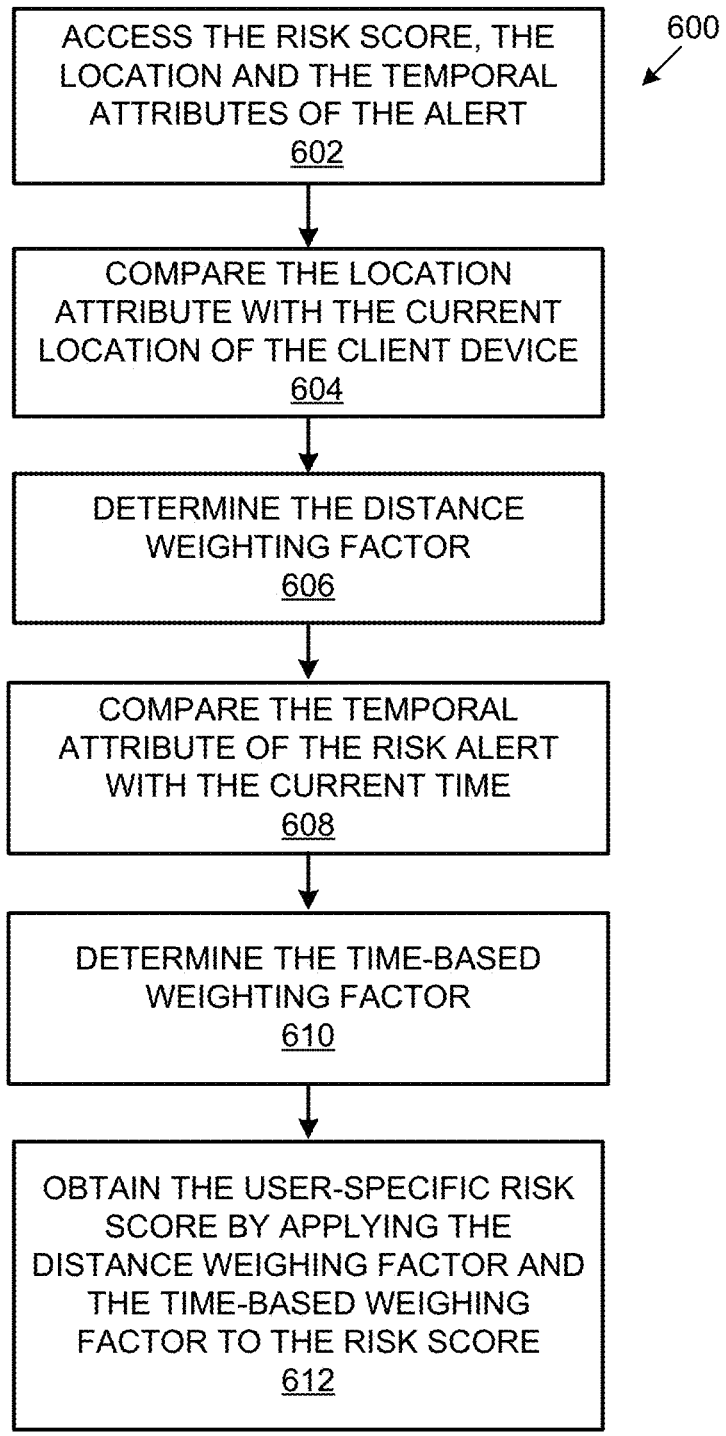
FIG. 6 shows a flowchart that details a method of obtaining a user-specific risk score in accordance with the examples disclosed herein.

FIG. 6 shows a flowchart 600 that details a method of obtaining the user-specific risk score in accordance with the examples disclosed herein. The risk score 192, the location, and the temporal attributes of the risk alert 190 are accessed at 602. At 604, the location attribute of the risk alert 190 is compared to the current location of the client device 130-1. At 606, a distance weighting factor that is inversely proportional to the distance between the location attribute and the current location of the client device 130-1 is determined based on the comparison. At 608, the temporal attribute of the risk alert 190 is compared to the current time or the date/time stamps of the corresponding location data as stored in the client device 130-1. At 610, a time-based weighting factor that is inversely proportional to the time differences between the date-time stamps or the current time and the temporal attributes is determined. The distance weighting factor and the time-based weighting factor are applied to the risk score 192 of the risk alert 190 at 612 to obtain the user-specific risk score 352. The user-specific risk score thus determined can be varied or recalculated in real-time to obtain a real-time, user-specific risk score which may be updated within short periods (e.g., every five minutes) based on a trajectory of travel/current direction and the current speed of the client device 130-1 relative to the location referred to in the risk alert 190. Moreover, if the feedback is received via the feedback mechanism 296 that the user is impacted by the emergency associated with the risk alert 190, then further action such as displaying emergency instructions including evacuation routes and locations on the client device can be executed. Furthermore, the risk score 192 associated with the risk alert can also be recalculated and updated to the plurality of client devices 130-1, . . . , 130-m.

In an example, the user-specific risk score can include an assessment of future risk. The risk processing app 200 may be configured to receive, via the client device 130-1, future location data identifying future locations of the user and future movement data identifying future movements of the user. For example, the user may provide to the risk processing app 200, future location data and future movement data indicating that the user will be traveling to a first city in a particular country and staying in the first city for three days, that the user will then be traveling from the first city to a second city in the particular country and staying in the second city for four days, and/or the like. The user may wish to determine a future risk score of the user based on the future location data and the future movement data. In response to user's explicit consent, the future location data and the time of travel can be provided to the risk processing platform 110 which may process the future location data, the future movement data, and the event data, with information from the plurality of data sources 150-1, . . . , 150-n using one or more of the plurality of ML-based risk assessment models 160-1, . . . , 160-k, to determine a future risk score for the user. In some implementations, the future risk score indicates risks that may be encountered by the user when traveling to the first city and the second city of the particular country via a given route and mode of transport. The risk processing platform 110 may provide, to the client device 130-1, the future risk score for a display to the user. The user may utilize such information to cancel the trip, alter the trip/route/mode of transport, or confirm the trip.

In some implementations, the risk processing platform 110 may store, manage, and provide notifications of risks in an open way that enables calculation of risk in real-time and using historical location information. The sharing of user identities and location data outside of the processing system 100 may be controlled by the individual. For example, users traveling soon may enable functions of the alert processing system 100, at-risk users associated with emergencies may enable additional functions of the alert processing system 100, such as calling for assistance, arranging for rescue operations, etc., by providing consent to share individual identities, current location data, current movement data, etc.

Figure 7A:
FIG. 7A shows a bad-weather alert generated in accordance with the examples disclosed herein.
Figure 7A:

FIG. 7A shows a bad-weather alert 700 that is displayed for a bad weather situation. The bad-weather alert 700 pertains to a first stage of alerting people anonymously that are at risk and to instantly provide a personalized treatment plan when disaster strikes. The risk processing platform 110 can provide a flow of user interfaces with warnings/alerts to a client device associated with a user. For example, after the warning or alert (e.g., a heavy hail storm) is approved and published, the risk processing platform 110 may provide the notification of the alert i.e., the risk alert 700 to the plurality of client device 130-1, . . . , 130-m. Each of the plurality of client devices 130-1, . . . , 130-m determines a user-specific risk score based on the location of the client device and the time of the warning. If the user-specific risk score is greater than the predetermined risk score then the warning is displayed as the bad-weather alert 700 on a client display. The initial bad weather alert is followed by an instructions screen 702 that provides instructions to the user regarding the precautions that should be taken in case the user is caught in the hail storm. Alerts are generally published with certain core information that can include a) area definition—i.e., the geographic locations which are at risk, b) the type of alert, c) the severity (i.e., high, medium, or low risk), or emergency alert which needs immediate attention d) start/finish—when the alert is relevant (i.e., currently relevant or a future alert), and e) a treatment plan which is generated from templates with specific information. For example, the treatment plan can be conveyed via the instructions screen 702 which can include suggestions or actions such as, 'seek immediate shelter', 'call 111-1111 for assistance', etc.). In an example, the alert author can request a count of the number of users who will receive the alert before it is sent so that the number of client devices receiving the alert can be restricted before transmitting the alert for better planning and also to avoid incorrectly notifying a large number of users thereby causing them needless concern.

Figure 7B:
FIG. 7B shows an emergency alert generated by a risk processing platform in accordance with the examples disclosed herein.
Figure 7B:

FIG. 7B shows an emergency alert 704 generated by the risk processing platform 110 in accordance with the examples disclosed herein. The bad-weather alert 700 is upgraded to the emergency alert 704 if the severity of the hail storm grows thereby impacting rural areas and approaching cities. Support instructions or treatment plan 706 to handle the emergency are transmitted to the client device upon user selection of the emergency alert 704 for further information.

Figure 7C:
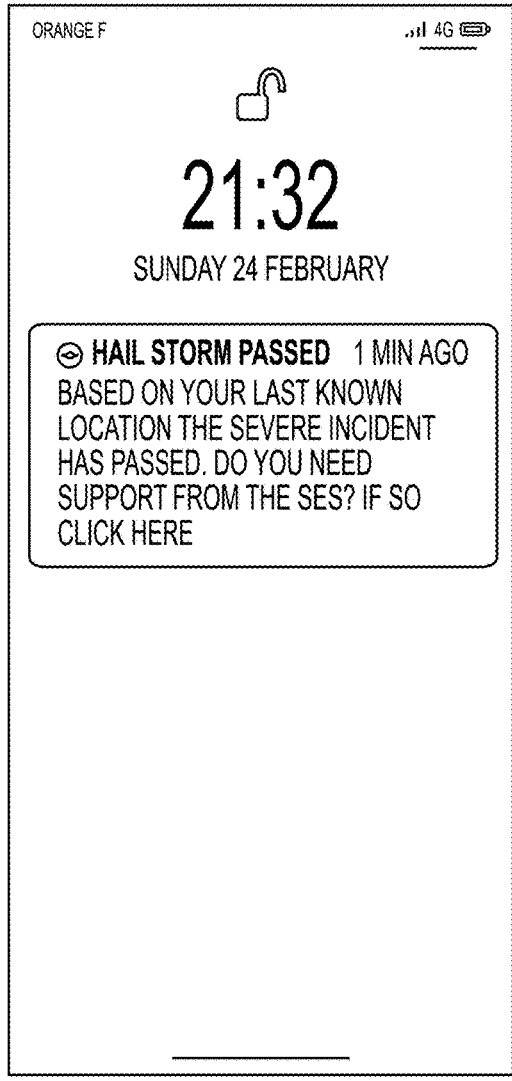
FIG. 7C shows a recovery alert based on a current time generated in accordance with the examples disclosed herein.
Figure 7C:

If the risk processing platform 110 determines that an alert area is set to recovery based on a current time, the alert processing system 100 may provide alert text conveying an update that the severe incident has passed based on a last known location of the client device. FIG. 7C shows such a recovery alert 710 based on a current time that can be transmitted upon passing of the hail storm. The recovery alert can include follow-up instructions 712 on actions to be taken or information regarding the assistance centers that can be approached for help to handle the storm damage. The recovery alert 710 is transmitted as part of the second stage which includes recovery and management of the emergency. This ensures that people are safe and are accounted for and can identify any new risks which include interactions in both the physical and digital world. It is during the second stage or recovery stage that providing user identity can become relevant in identifying victims/survivors against the lists of names and locations. The alert processing system 100 includes the ability to seamlessly move from being unknown to being known and maintaining state throughout the treatment plan. An authenticated digital id can be the key to enabling a user to seamlessly interact digitally and physically and shift from unknown to known.

Figure 8:
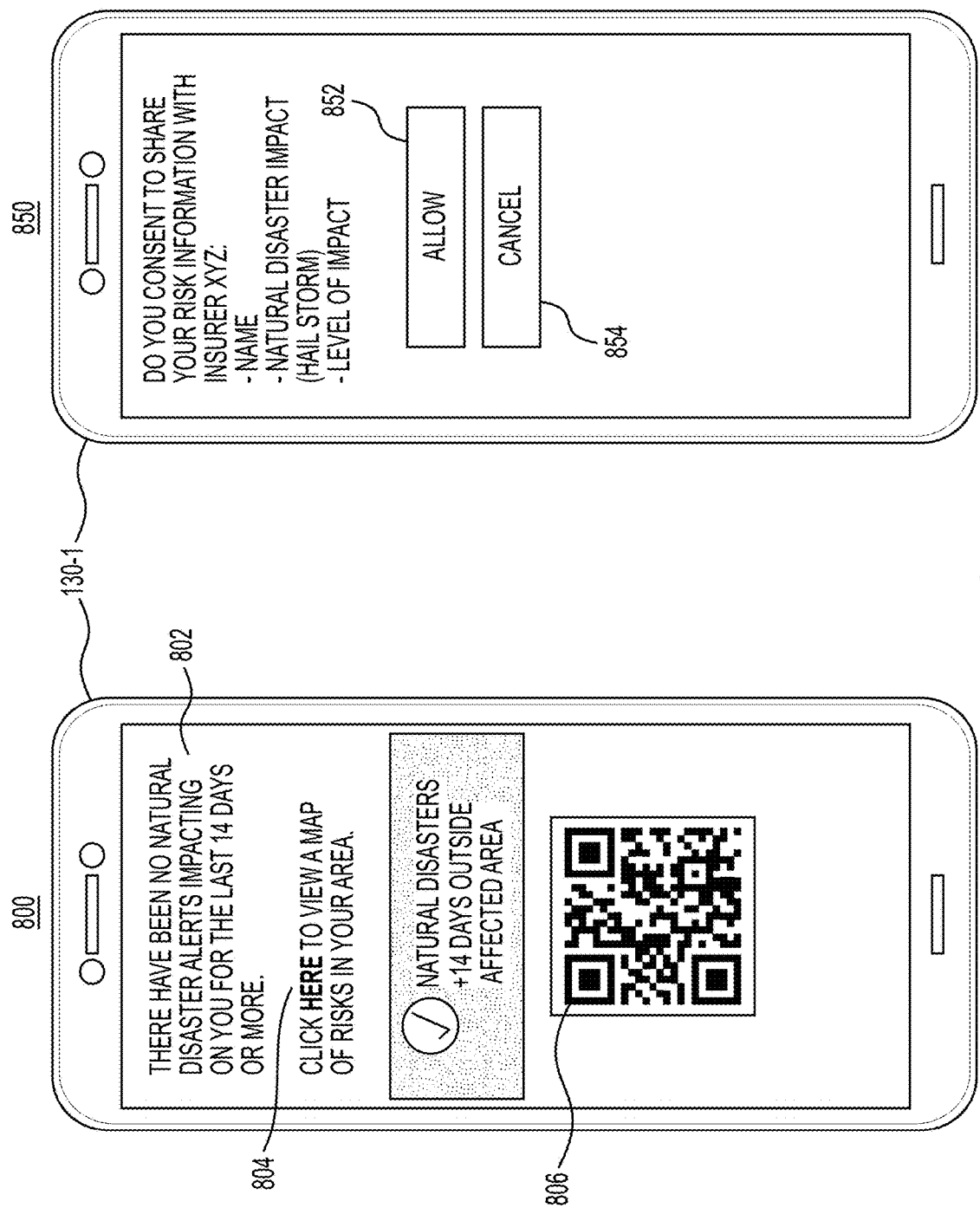
FIG. 8 shows a status and presentation screen generated on a client device in accordance with the examples disclosed herein.

FIG. 8 shows a status and presentation screen 800 generated on the client device 130-1 in accordance with the examples disclosed herein. During emergencies, the ability to share and confirm status and location enables situational awareness and provides relief and recovery assistance when it is needed most. The status and presentation screen 800 provides the current status of the user associated with the client device 130-1, and the ability to share the status through to details enables supporting treatment actions and planning. The currently active alerts can be displayed at 802, a map of the affected geographical area/location attribute of any active alert can be shown using the link 804, while the QR code 806 enables the user to share the user's status and other details at a physical location to receive assistance. For example, when a user reaches a relief center, the user can scan the QR code 806 to update the records with the user's presence information at the relief center. In addition to the currently active alerts, other notifications pertaining to the number of active alerts received in the last few days, the current distance of the client device 130-1 to the affected geographic area, and other relevant information can be displayed on the status and presentation screen 800. The risk processing app 200 supports options to use QR scan or the client device 130-1 to share status seamlessly with any business process, such as but not limited to, a control point associated with an assistance center, an insurer to confirm that the user associated with the client device 130-1 is impacted by the risk assessment situation, with a bank/government to confirm that the user is impacted and access support, such as daily disaster relief packages, etc. The consent screen 850 enables the user to share or to keep private, the user data via the 'allow' button 852 and the 'cancel' button 854.

Figure 9:
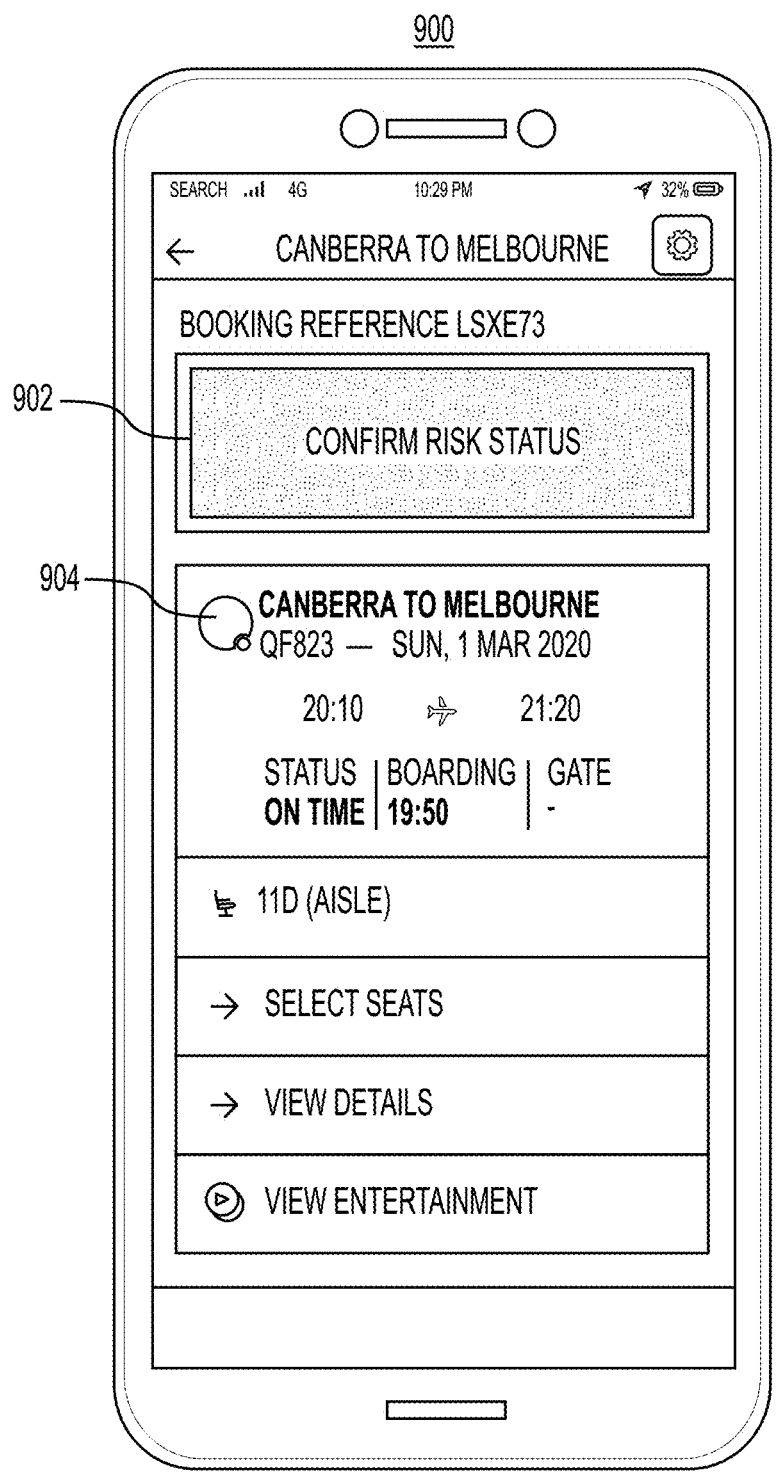
FIG. 9 shows a mobile check-in user interface generated in accordance with the examples disclosed herein.

FIG. 9 shows a mobile check-in user interface 900 generated in accordance with examples disclosed herein. The calculation of a risk score for a specific user request is illustrated in this example. In an example, the risk processing app 200 can be configured to share the user's risk status with one or more of the plurality of applications, which may be included within a given client device. The mobile check-in user interface 900 may include a selection mechanism (e.g., a confirm risk status button 902) that enables the user to share risk status seamlessly with passenger control officers. When the confirm risk status button 902 is clicked, the alert processing system 100 may provide for a scan at a kiosk user interface associated with a user. The scan at the kiosk user interface may include a QR code that enables the user to share risk status via the kiosk.

It can be appreciated that the user-specific risk score displayed in response to clicking the confirm risk status button 902 can include a future risk score. The travel itinerary 904 can be accessed by the risk processing app 200 via the application (e.g., a mobile web browser) displaying it. The future location data (e.g., Melbourne) and the future temporal data (e.g., 21:20) is extracted by the risk processing app 200 to determine the future risk score.

Figure 10:
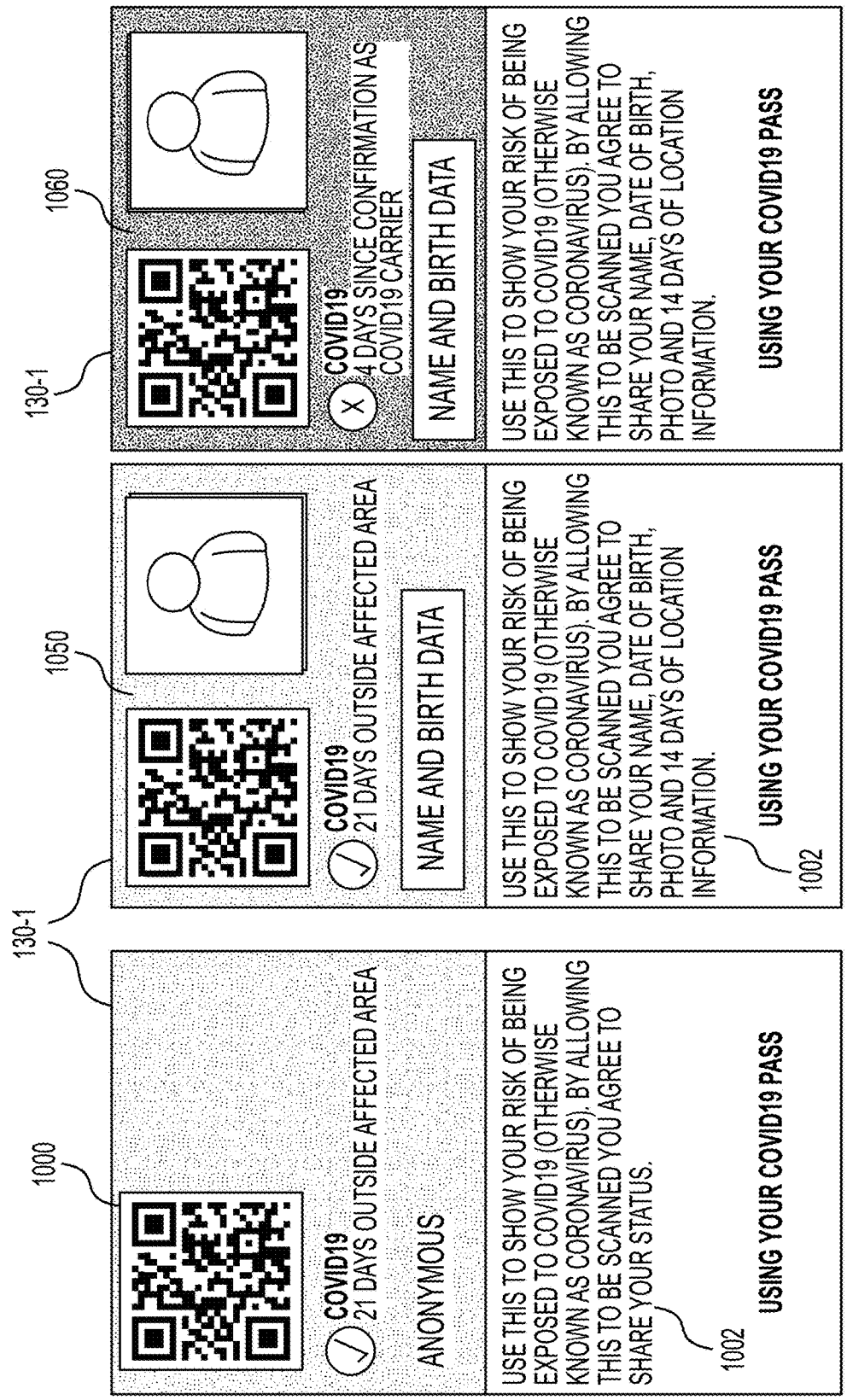
FIG. 10 shows risk-sharing User Interfaces (UIs) provided by the risk processing app in accordance with the examples disclosed herein.

FIG. 10 shows risk sharing UIs 1000 and 1050 provided by the risk processing app 200 in accordance with the examples disclosed herein. The client device 130-1 may display the risk sharing user interface 1000 that includes anonymous information indicating that the user was exposed to the coronavirus twenty-one days ago. The risk sharing UI 1000 shares certain user data that the user was outside the COVID 19 affected zones for 21 days. However, the user's data is exposed by the risk sharing UI 1000 anonymously without sharing any of the user details.

The risk sharing UI 1050 also shares the information that the user was outside the COVID-19 affected zones for 21 days. However, the risk sharing UI 1050 includes information identifying the user (e.g., a name, a birthdate, a picture, and/or the like) and information indicating that the user was exposed to the coronavirus twenty-one days ago. The user info area 1002 informs the user regarding the data shared by the user by exposing the UIs 1000 and 1050. The risk processing app 200 enables the client device 130-1 to further display another risk sharing user interface 1060 when the user is affected by COVID19. The risk sharing user interface 1060 is updated to include information identifying the user and information indicating that the user has been a confirmed coronavirus carrier for four days.

The alert processing system 100 enables sharing status and user identity in real-world scenarios in addition to supporting the ability to track and manage physical treatments such as knowing who someone is even as they arrive in emergency locations in addition to knowing their status (i.e., whether they are vulnerable, or in isolation, etc.) The status can include a plurality of risk levels mapped to corresponding ranges of the user-specific risk scores. The plurality of risk levels can include a first risk level (e.g., Level 0), a second risk level (e.g., Level 1), a third risk level (e.g., Level 2), a fourth risk level (e.g., Level 3), a fifth risk level (e.g., Level 4), and/or the like. The first risk level may include an anonymous risk level where the alert processing system 100 provides a risk impacting a user based on user location and recent travel history, and, based on consent, the user can share the risk with other selected users. The second risk level may include an identified risk level where a risk level is increased, and the user needs to validate, to the alert processing system 100, that a client device 130-1 associated with the user has been in locations of low risk. The third risk level may include sharing the location history of the user since the user has been exposed to risk or has been confirmed as at risk by the alert processing system 100. The user may consent to share recent location history with a trusted organization to better understand the risk of the user to the user's community. The fourth risk level may include a heightened risk assessment where the user is required to provide additional information to manage the risk to the user. The fifth risk level may include an emergency risk level where a risk has become widespread in the user's area, and the user consents to share location, speed, direction, and/or the like in real-time to a trusted organization to better support and protect the user and the user's community.

Figure 11:
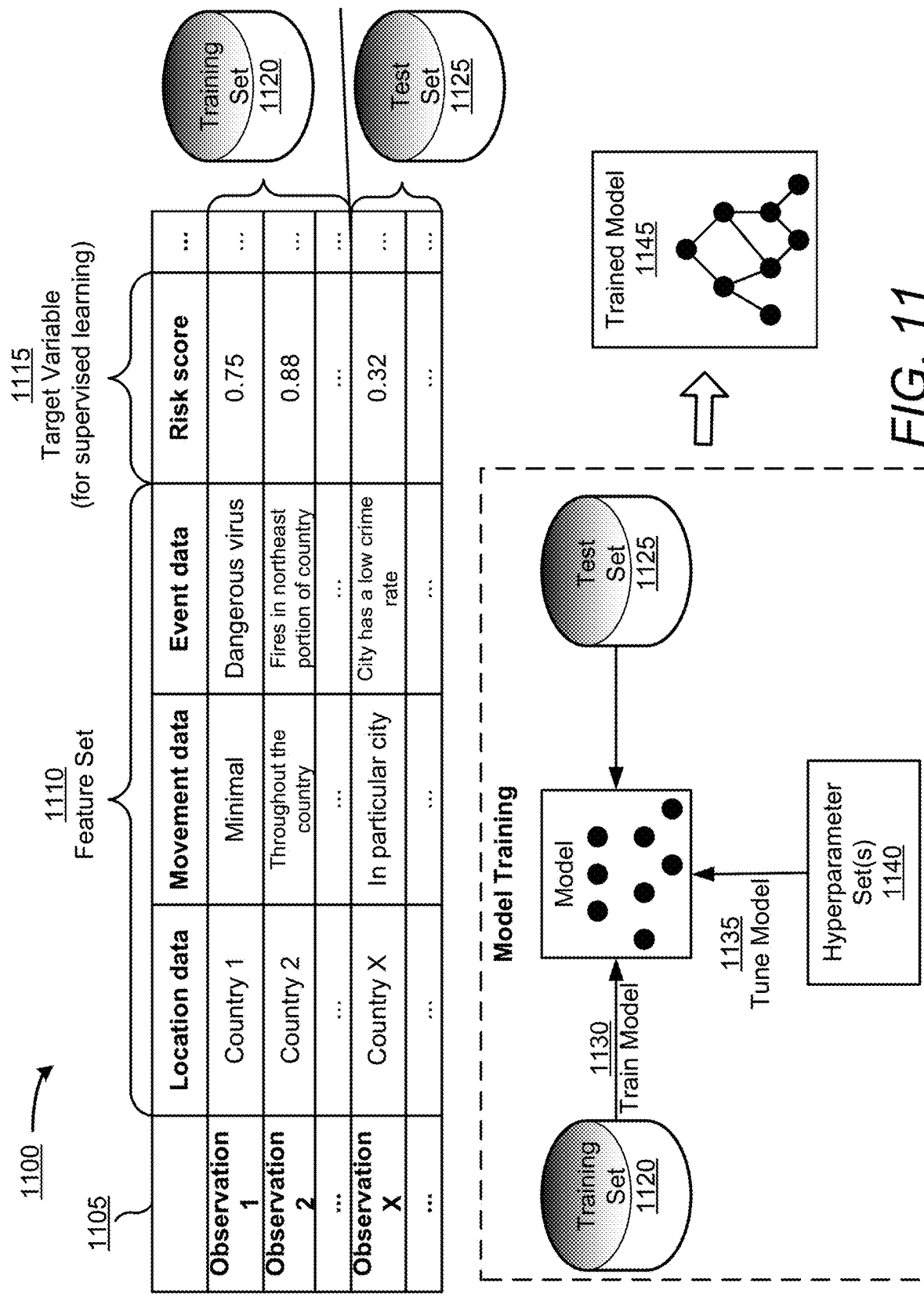
FIG. 11 is a diagram illustrating an example of training a machine learning model.

FIG. 11 is a diagram illustrating an example 1100 of training a machine learning model. The machine learning model training described herein may be performed using a machine learning system. The machine learning system may include a computing device, a server, a cloud computing environment, and/or the like, such as the risk assessment platform.

As shown by reference number 1105, a machine learning model may be trained using a set of observations. The set of observations may be obtained and/or input from historical data, such as data gathered during one or more processes described herein. For example, the set of observations may include data gathered from user interaction with and/or user input to the client devices, as described elsewhere herein. In some implementations, the machine learning system may receive the set of observations (e.g., as input) from the client devices.

As shown by reference number 1110, a feature set may be derived from the set of observations. The feature set may include a set of variable types. A variable type may be referred to as a feature. A specific observation may include a set of variable values corresponding to the set of variable types. A set of variable values may be specific to an observation. In some cases, different observations may be associated with different sets of variable values, sometimes referred to as feature values. In some implementations, the machine learning system may determine variable values for a specific observation based on input received from the client devices. For example, the machine learning system may identify a feature set (e.g., one or more features and/or corresponding feature values) from structured data input to the machine learning system, such as by extracting data from a particular column of a table, extracting data from a particular field of a form, extracting data from a particular field of a message, extracting data received in a structured data format, and/or the like. In some implementations, the machine learning system may determine features (e.g., variable types) for a feature set based on input received from the client devices, such as by extracting or generating a name for a column, extracting or generating a name for a field of a form and/or a message, extracting or generating a name based on a structured data format, and/or the like. Additionally, or the machine learning system may receive input from an operator to determine features and/or feature values. In some implementations, the machine learning system may perform natural language processing and/or another feature identification technique to extract features (e.g., variable types) and/or feature values (e.g., variable values) from text (e.g., unstructured data) input to the machine learning system, such as by identifying keywords and/or values associated with those keywords from the text.

As an example, a feature set for a set of observations may include a first feature of location data, the second feature of movement data, the third feature of event data, and so on. As shown, for a first observation, the first feature may have a value of a first country (e.g., country 1), the second feature may have a value of minimal movement, the third feature may have a value of a dangerous virus in the first country, and so on. These features and feature values are provided as examples and may differ in other examples. For example, the feature set may include one or more of the following features: location data, movement data, event data, and/or the like. In some implementations, the machine learning system may pre-process and/or perform dimensionality reduction to reduce the feature set and/or combine features of the feature set to a minimum feature set. A machine learning model may be trained on the minimum feature set, thereby conserving resources of the machine learning system (e.g., processing resources, memory resources, and/or the like) used to train the machine learning model.

As shown by reference number 1115, the set of observations may be associated with a target variable type. The target variable type may represent a variable having a numeric value (e.g., an integer value, a floating point value, and/or the like), may represent a variable having a numeric value that falls within a range of values or has some discrete possible values, may represent a variable that is selectable from one of the multiple options (e.g., one of the multiple classes, classifications, labels, and/or the like), may represent a variable having a Boolean value (e.g., 0 or 1, True or False, Yes or No), and/or the like. A target variable type may be associated with a target variable value, and a target variable value may be specific to an observation. In some cases, different observations may be associated with different target variable values.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model, a predictive model, and/or the like. When the target variable type is associated with continuous target variable values (e.g., a range of numbers and/or the like), the machine learning model may employ a regression technique. When the target variable type is associated with categorical target variable values (e.g., classes, labels, and/or the like), the machine learning model may employ a classification technique.

In some implementations, the machine learning model may be trained on a set of observations that do not include a target variable (or that include a target variable, but the machine learning model is not being executed to predict the target variable). This may be referred to as an unsupervised learning model, an automated data analysis model, an automated signal extraction model, and/or the like. In this case, the machine learning model may learn patterns from the set of observations without labeling or supervision and may provide an output that indicates such patterns, such as by using clustering and/or association to identify related groups of items within the set of observations.

As further shown, the machine learning system may partition the set of observations into a training set 1120 that includes a first subset of observations, of the set of observations, and a test set 1125 that includes a second subset of observations of the set of observations. The training set 1120 may be used to train (e.g., fit, tune, and/or the like) the machine learning model, while the test set 1125 may be used to evaluate a machine learning model that is trained using the training set 1120. For example, for supervised learning, the test set 1125 may be used for initial model training using the first subset of observations, and the test set 1125 may be used to test whether the trained model accurately predicts target variables in the second subset of observations. In some implementations, the machine learning system may partition the set of observations into the training set 1120 and the test set 1125 by including a first portion or a first percentage of the set of observations in the training set 1120 (e.g., 75%, 80%, or 85%, among other examples) and including a second portion or a second percentage of the set of observations in the test set 1125 (e.g., 25%, 20%, or 15%, among other examples). In some implementations, the machine learning system may randomly select observations to be included in the training set 1120 and/or the test set 1125.

As shown by reference number 1130, the machine learning system may train a machine learning model using the training set 1120. This training may include executing, by the machine learning system, a machine learning algorithm to determine a set of model parameters based on the training set 1120. In some implementations, the machine learning algorithm may include a regression algorithm (e.g., linear regression, logistic regression, and/or the like), which may include a regularized regression algorithm (e.g., Lasso regression, Ridge regression, Elastic-Net regression, and/or the like). Additionally, or alternatively, the machine learning algorithm may include a decision tree algorithm, which may include a tree ensemble algorithm (e.g., generated using bagging and/or boosting), a random forest algorithm, a boosted trees algorithm, and/or the like. A model parameter may include an attribute of a machine learning model that is learned from data input into the model (e.g., the training set 1120). For example, for a regression algorithm, a model parameter may include a regression coefficient (e.g., a weight). For a decision tree algorithm, a model parameter may include a decision tree split location, as an example.

As shown by reference number 1135, the machine learning system may use one or more hyperparameter sets 1140 to tune the machine learning model. A hyperparameter may include a structural parameter that controls the execution of a machine learning algorithm by the machine learning system, such as a constraint applied to the machine learning algorithm. Unlike a model parameter, a hyperparameter is not learned from data input into the model. An example hyperparameter for a regularized regression algorithm includes a strength (e.g., a weight) of a penalty applied to a regression coefficient to mitigate overfitting of the machine learning model to the training set 1120. The penalty may be applied based on a size of a coefficient value (e.g., for Lasso regression, such as to penalize large coefficient values), may be applied based on a squared size of a coefficient value (e.g., for Ridge regression, such as to penalize large squared coefficient values), may be applied based on a ratio of the size and the squared size (e.g., for Elastic-Net regression), may be applied by setting one or more feature values to zero (e.g., for automatic feature selection), and/or the like. Example hyperparameters for a decision tree algorithm include a tree ensemble technique to be applied (e.g., bagging, boosting, a random forest algorithm, a boosted trees algorithm, and/or the like), a number of features to evaluate, a number of observations to use, a maximum depth of each decision tree (e.g., a number of branches permitted for the decision tree), a number of decision trees to include in a random forest algorithm, and/or the like.

To train a machine learning model, the machine learning system may identify a set of machine learning algorithms to be trained (e.g., based on operator input that identifies the one or more machine learning algorithms, based on a random selection of a set of machine learning algorithms, and/or the like), and may train the set of machine learning algorithms (e.g., independently for each machine learning algorithm in the set) using the training set 1120. The machine learning system may tune each machine learning algorithm using one or more hyperparameter sets 1140 (e.g., based on operator input that identifies hyperparameter sets 1140 to be used, based on randomly generating hyperparameter values, and/or the like). The machine learning system may train a particular machine learning model using a specific machine learning algorithm and a corresponding hyperparameter set 1140 for calculating or generating a risk score associated with a particular risk assessment situation. In some implementations, the machine learning system may train multiple machine learning models to generate a set of model parameters for each machine learning model, where each machine learning model corresponds to a different combination of a machine learning algorithm and a hyperparameter set 1140 for that machine learning algorithm.

In some implementations, the machine learning system may perform cross-validation when training a machine learning model. Cross-validation can be used to obtain a reliable estimate of machine learning model performance using only the training set 1120, and without using the test set 1125, such as by splitting the training set 1120 into a number of groups (e.g., based on operator input that identifies the number of groups, based on randomly selecting a number of groups, and/or the like) and using those groups to estimate model performance. For example, using k-fold cross-validation, observations in the training set 1120 may be split into k groups (e.g., in order or at random). For a training procedure, one group may be marked as a hold-out group, and the remaining groups may be marked as training groups. For the training procedure, the machine learning system may train a machine learning model on the training groups and then test the machine learning model on the hold-out group to generate a cross-validation score. The machine learning system may repeat this training procedure using different hold-out groups and different test groups to generate a cross-validation score for each training procedure. In some implementations, the machine learning system may independently train the machine learning model k times, with each individual group being used as a hold-out group once and being used as a training group k−1 times. The machine learning system may combine the cross-validation scores for each training procedure to generate an overall cross-validation score for the machine learning model. The overall cross-validation score may include, for example, an average cross-validation score (e.g., across all training procedures), a standard deviation across cross-validation scores, a standard error across cross-validation scores, and/or the like.

In some implementations, the machine learning system may perform cross-validation when training a machine learning model by splitting the training set into a number of groups (e.g., based on operator input that identifies the number of groups, based on randomly selecting a number of groups, and/or the like). The machine learning system may perform multiple training procedures and may generate a cross-validation score for each training procedure. The machine learning system may generate an overall cross-validation score for each hyperparameter set 1140 associated with a particular machine learning algorithm. The machine learning system may compare the overall cross-validation scores for different hyperparameter sets 1140 associated with the particular machine learning algorithm, and may select the hyperparameter set 1140 with the best (e.g., highest accuracy, lowest error, closest to a desired threshold, and/or the like) overall cross-validation score for training the machine learning model. The machine learning system may then train the machine learning model using the selected hyperparameter set 1140, without cross-validation (e.g., using all of the data in the training set 1120 without any hold-out groups), to generate a single machine learning model for a particular machine learning algorithm. The machine learning system may then test this machine learning model using the test set 1125 to generate a performance score, such as a mean squared error (e.g., for regression), a mean absolute error (e.g., for regression), an area under receiver operating characteristic curve (e.g., for classification), and/or the like. If the machine learning model performs adequately (e.g., with a performance score that satisfies a threshold), then the machine learning system may store that machine learning model as a trained machine learning model 1145 to be used to analyze new observations, as described below in connection with FIG. 12.

In some implementations, the machine learning system may perform cross-validation, as described above, for multiple machine learning algorithms (e.g., independently), such as a regularized regression algorithm, different types of regularized regression algorithms, a decision tree algorithm, different types of decision tree algorithms, and/or the like. Based on performing cross-validation for multiple machine learning algorithms, the machine learning system may generate multiple machine learning models, where each machine learning model has the best overall cross-validation score for a corresponding machine learning algorithm. The machine learning system may then train each machine learning model using the entire training set 1120 (e.g., without cross-validation), and may test each machine learning model using the test set 1125 to generate a corresponding performance score for each machine learning model. The machine learning model may compare the performance scores for each machine learning model and may select the machine learning model with the best (e.g., highest accuracy, lowest error, closest to a desired threshold, and/or the like) performance score as the trained machine learning model 1145.

As indicated above, FIG. 11 is provided as an example. Other examples may differ from what is described in connection with FIG. 11. For example, the machine learning model may be trained using a different process than what is described in connection with FIG. 11. Additionally, or alternatively, the machine learning model may employ a different machine learning algorithm than what is described in connection with FIG. 11, such as a Bayesian estimation algorithm, a k-nearest neighbor algorithm, an a priori algorithm, a k-means algorithm, a support vector machine algorithm, a neural network algorithm (e.g., a convolutional neural network algorithm), a deep learning algorithm, and/or the like.

Figure 12:
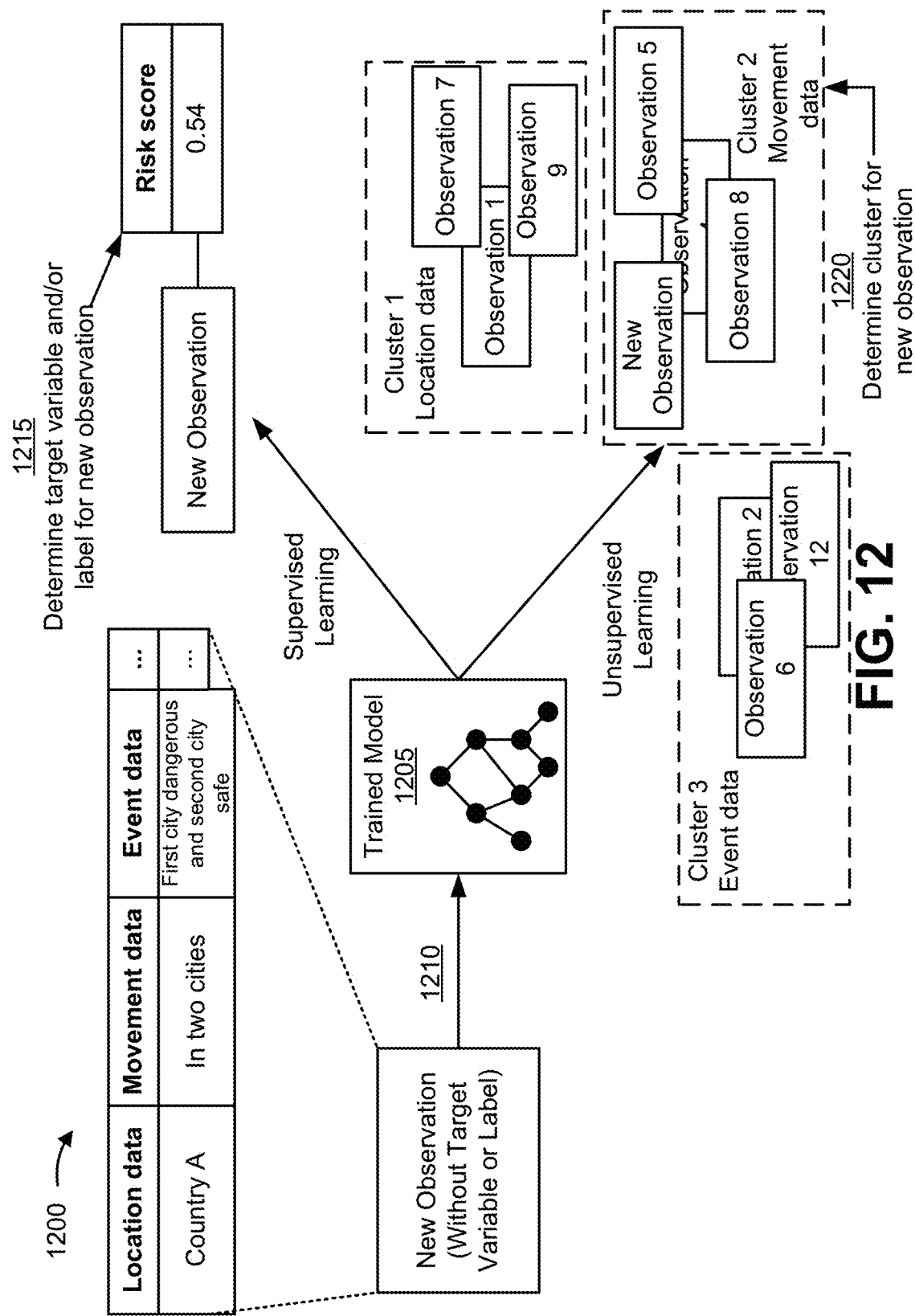
FIG. 12 is a diagram illustrating an example of applying a trained machine learning model to a new observation.

FIG. 12 is a diagram illustrating an example 1200 of applying a trained machine learning model to a new observation. The new observation may be input to a machine learning system that stores a trained machine learning model 1205. In some implementations, the trained machine learning model 1205 may be the trained machine learning model 245 described above in connection with FIG. 11. The machine learning system may include a computing device, a server, a cloud computing environment, and/or the like, such as the risk assessment platform.

As shown by reference number 1210, the machine learning system may receive a new observation (or a set of new observations) and may input the new observation to the machine learning model 1205. As shown, the new observation may include a first feature of country A, a second feature of moving through two cities in country A, a third feature of a first city is dangerous and a second city is safe, and so on, as an example. The machine learning system may apply the trained machine learning model 1205 to the new observation to generate an output (e.g., a result). The type of output may depend on the type of machine learning model and/or the type of machine learning task being performed. For example, the output may include a predicted (e.g., estimated) value of a target variable (e.g., a value within a continuous range of values, a discrete value, a label, a class, a classification, and/or the like), such as when supervised learning is employed. Additionally, or alternatively, the output may include information that identifies a cluster to which the new observation belongs, information that indicates a degree of similarity between the new observation and one or more prior observations (e.g., which may have previously been new observations input to the machine learning model and/or observations used to train the machine learning model), and/or the like, such as when unsupervised learning is employed.

In some implementations, the trained machine learning model 1205 may predict a value of "0.54" for the target variable of a risk score for the new observation, as shown by reference number 1215. Based on this prediction (e.g., based on the value having a particular label/classification, based on the value satisfying or failing to satisfy a threshold, and/or the like), the machine learning system may provide a recommendation, such as a user is facing moderate risk in country A. Additionally, or alternatively, the machine learning system may perform an automated action and/or may cause an automated action to be performed (e.g., by instructing another device to perform the automated action), such as notifying the user to avoid the first city and visit the second city. As another example, if the machine learning system were to predict a value of "0.95" for the target variable of a risk score, then the machine learning system may provide a different recommendation (e.g., the user is facing severe risk by traveling to the country A) and/or may perform or cause the performance of a different automated action (e.g., canceling the trip to country A). In some implementations, the recommendation and/or the automated action may be based on the target variable value having a particular label (e.g., classification, categorization, and/or the like), maybe based on whether the target variable value satisfies one or more thresholds (e.g., whether the target variable value is greater than a threshold, is less than a threshold, is equal to a threshold, falls within a range of threshold values, and/or the like), and/or the like.

In some implementations, the trained machine learning model 1205 may classify (e.g., cluster) the new observation in a location data cluster, as shown by reference number 1220. The observations within a cluster may have a threshold degree of similarity. Based on classifying the new observation in the location data cluster, the machine learning system may provide a recommendation, such as country A is a relatively safe destination. Additionally, or alternatively, the machine learning system may perform an automated action and/or may cause an automated action to be performed (e.g., by instructing another device to perform the automated action), such as be careful in the first city and spend more time in the second city. As another example, if the machine learning system were to classify the new observation in a movement data cluster, then the machine learning system may provide a different recommendation (e.g., travel to the second city) and/or may perform or cause the performance of a different automated action (e.g., instructing the user to travel to the second city).

In this way, the machine learning system may apply a rigorous and automated process to determine risk scores for individuals based on geographical locations and movements of the individuals. The machine learning system enables recognition and/or identification of tens, hundreds, thousands, or millions of features and/or feature values for tens, hundreds, thousands, or millions of observations, thereby increasing the accuracy and consistency of determining risk scores for individuals based on geographical locations and movements of the individuals relative to requiring computing resources to be allocated for tens, hundreds, or thousands of operators to manually determine risk scores for individuals based on geographical locations and movements of the individuals using the features or feature values.

As indicated above, FIG. 12 is provided as an example. Other examples may differ from what is described in connection with FIG. 12.

Figure 13:
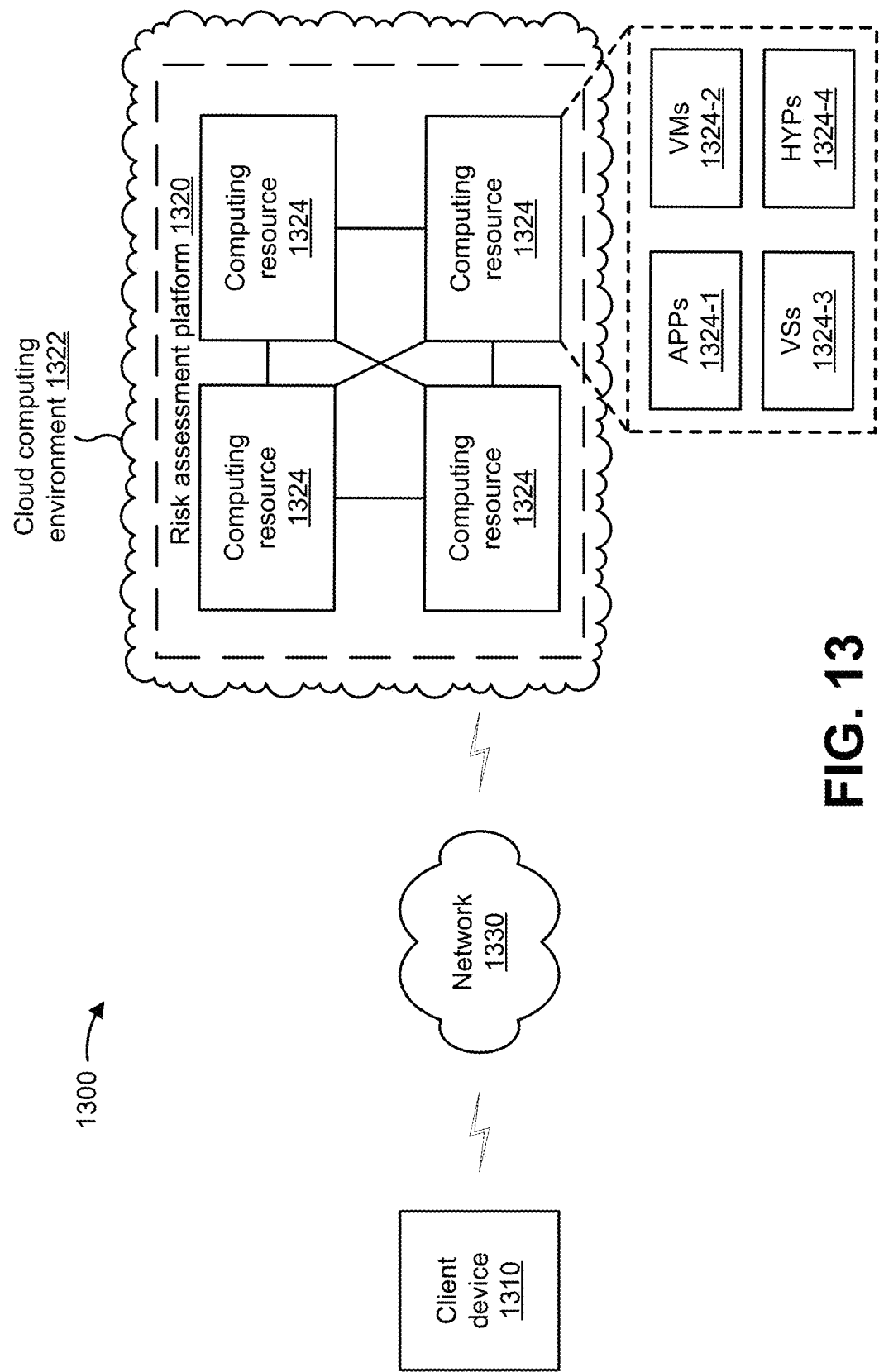
FIG. 13 is a diagram of an example environment in which systems and/or methods described herein may be implemented.

FIG. 13 is a diagram of an example environment 1300 in which systems and/or methods described herein may be implemented. As shown in FIG. 13, environment 1300 may include a client device 1310, a risk processing platform 1320, and a network 1330. Devices of environment 1300 may interconnect via wired connections, wireless connections, or a combination of wired and wireless connections.

The client device 1310 includes one or more devices capable of receiving, generating, storing, processing, and/or providing information, such as the information described herein. For example, client device 1310 may receive information from and/or transmit information to risk processing platform 1320. In some implementations, client device 1310 may include a mobile phone (e.g., a smartphone, a radiotelephone, and/or the like), a laptop computer, a tablet computer, a handheld computer, a gaming device, a wearable communication device (e.g., a smart wristwatch, a pair of smart eyeglasses, and/or the like), a global positioning system (GPS) device, a server device, a personal computer, or a similar type of device.

Alerts processing platform 110 includes one or more devices that utilize machine learning to determine risk scores for individuals based on geographical locations and movements of the individuals. In some implementations, alerts processing platform 110 may be modular, such that certain software components may be swapped in or out depending on a particular need. As such, alerts processing platform 110 may be easily and/or quickly reconfigured for different uses. In some implementations, alerts processing platform 110 may receive information from and/or transmit information to one or more client devices 1310.

In some implementations, as shown, alerts processing platform 110 may be hosted in a cloud computing environment 1322. Notably, while implementations described herein describe alerts processing platform 110 as being hosted in cloud computing environment 1322, in some implementations, alerts processing platform 110 may not be cloud-based (i.e., may be implemented outside of a cloud computing environment) or may be partially cloud-based.

Cloud computing environment 1322 includes an environment that may host alerts processing platform 110. Cloud computing environment 1322 may provide computation, software, data access, storage, etc., services that do not require end-user knowledge of a physical location and configuration of one or more systems and/or devices that host alerts processing platform 110. As shown, cloud computing environment 1322 may include a group of computing resources 1324 (referred to collectively as "computing resources 1322" and individually as "computing resource 1324").

Computing resource 1324 includes one or more personal computers, workstation computers, server devices, or other types of computation and/or communication devices. In some implementations, computing resource 1324 may host risk processing platform 1320. Cloud resources may include compute instances executing in computing resource 1324, storage devices provided in computing resource 1324, data transfer devices provided by computing resource 1324, etc. In some implementations, computing resource 1324 may communicate with other computing resources 1324 via wired connections, wireless connections, or a combination of wired and wireless connections.

As further shown in FIG. 13, computing resource 1324 includes a group of cloud resources, such as one or more applications ("APPs") 1324-1, one or more virtual machines ("VMs") 1324-2, virtualized storage ("VSs") 1324-3, one or more hypervisors ("HYPs") 1324-13, and/or the like.

Application 1324-1 includes one or more software applications that may be provided to or accessed by client device 1310. Application 1324-1 may eliminate a need to install and execute the software applications on client device 1310. For example, application 1324-1 may include software associated with risk processing platform 1320 and/or any other software capable of being provided via cloud computing environment 1322. In some implementations, one application 1324-1 may send/receive information to/from one or more other applications 1324-1, via virtual machine 1324-2.

Virtual machine 1324-2 includes a software implementation of a machine (e.g., a computer) that executes programs like a physical machine. Virtual machine 1324-2 may be either a system virtual machine or a process virtual machine, depending upon use and degree of correspondence to any real machine by virtual machine 1324-2. A system virtual machine may provide a complete system platform that supports the execution of a complete operating system. A process virtual machine may execute a single program, and may support a single process. In some implementations, virtual machine 1324-2 may execute on behalf of a user (e.g., client device 1310 or an operator of risk processing platform 1320), and may manage the infrastructure of the cloud computing environment 1322, such as data management, synchronization, or long-duration data transfers.

Virtualized storage 1324-3 includes one or more storage systems and/or one or more devices that use virtualization techniques within the storage systems or devices of computing resource 1324. In some implementations, within the context of a storage system, types of virtualizations may include block virtualization and file virtualization. Block virtualization may refer to the abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 1323-4 may provide hardware virtualization techniques that allow multiple operating systems (e.g., "guest operating systems") to execute concurrently on a host computer, such as computing resource 1323. Hypervisor 1323-13 may present a virtual operating platform to the guest operating systems and may manage the execution of the guest operating systems. Multiple instances of a variety of operating systems may share virtualized hardware resources.

Network 1330 includes one or more wired and/or wireless networks. For example, network 1330 may include a cellular network (e.g., a fifth-generation (5G) network, a long-term evolution (LTE) network, a third-generation (3G) network, a code division multiple access (CDMA) network, and/or the like), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or the like, and/or a combination of these or other types of networks.

The number and arrangement of devices and networks shown in FIG. 13 are provided as an example. In practice, there may be additional devices and/or networks, fewer devices and/or networks, different devices and/or networks, or differently arranged devices and/or networks than those shown in FIG. 13. Furthermore, two or more devices shown in FIG. 13 may be implemented within a single device, or a single device shown in FIG. 13 may be implemented as multiple, distributed devices. Additionally, or alternatively, a set of devices (e.g., one or more devices) of environment 1300 may perform one or more functions described as being performed by another set of devices of environment 1300.

Figure 14:
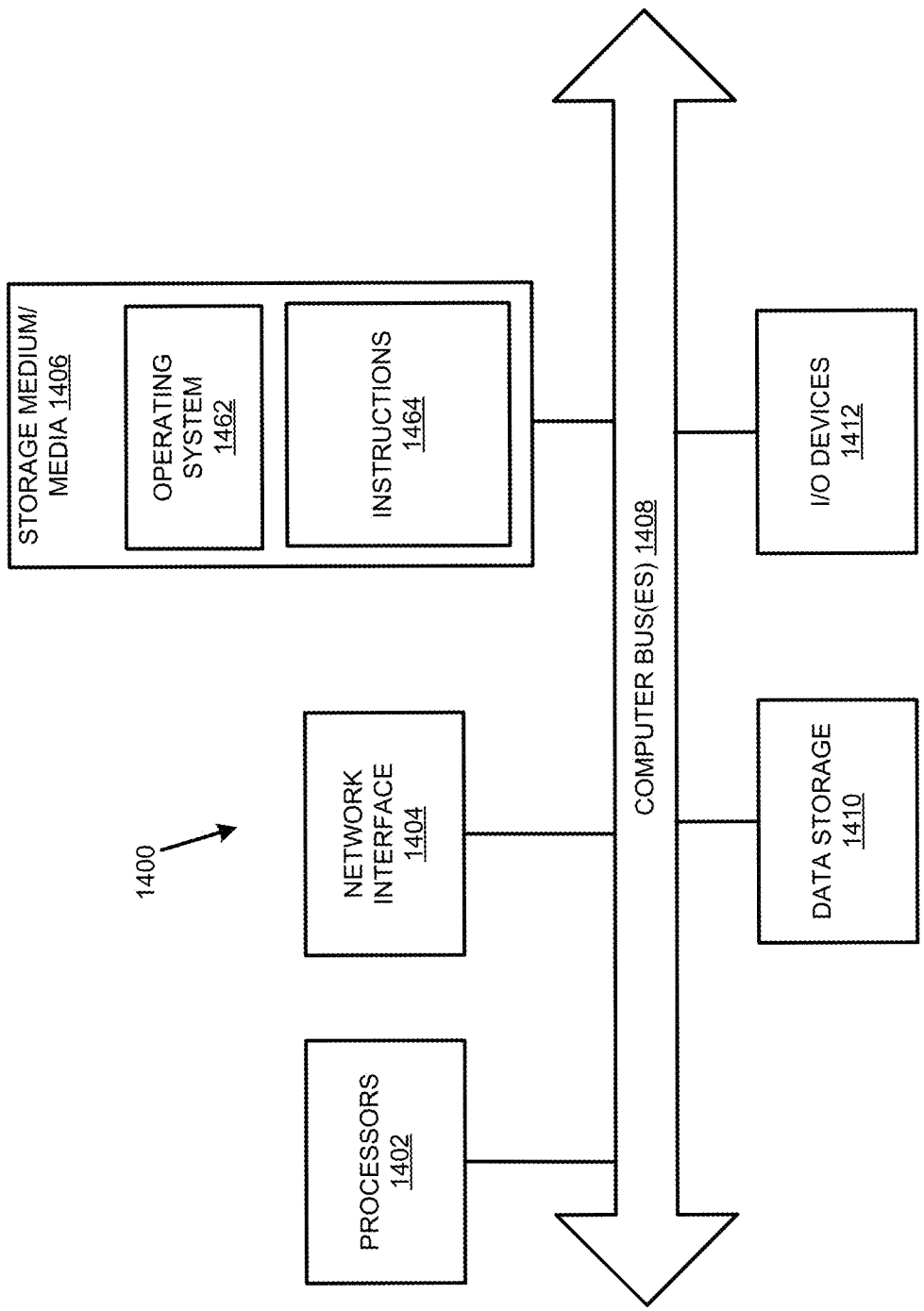
FIG. 14 illustrates a computer system that may be used to implement the location-based alert processing system in accordance with the examples disclosed herein.

FIG. 14 illustrates a computer system 1400 that may be used to implement one or more of the alert processing system 100 100 and the transaction processing system 150. More particularly, computing machines such as desktops, laptops, smartphones, tablets, and wearables which may be used to generate or access the data from one or more of the alert processing system 100 may have the structure of the computer system 1400. The computer system 1400 may include additional components not shown and that some of the process components described may be removed and/or modified. In another example, a computer system 1400 can sit on external-cloud platforms such as Amazon Web Services, AZURE® cloud or internal corporate cloud computing clusters, or organizational computing resources, etc.

The computer system 1400 includes processor(s) 1402, such as a central processing unit, ASIC or another type of processing circuit, input/output devices 1412, such as a display, mouse keyboard, etc., a network interface 1404, such as a Local Area Network (LAN), a wireless 802.11x LAN, a 3G, 4G or 5G mobile WAN or a WiMax WAN, and a processor-readable medium 1406. Each of these components may be operatively coupled to a bus 1408. The computer-readable medium 1406 may be any suitable medium that participates in providing instructions to the processor(s) 1402 for execution. For example, the processor-readable medium 1406 may be a non-transitory or non-volatile medium, such as a magnetic disk or solid-state non-volatile memory, or a volatile medium such as RAM. The instructions or modules stored on the processor-readable medium 1406 may include machine-readable instructions 1464 executed by the processor(s) 1402 that cause the processor(s) 1402 to perform the methods and functions of one or more of the alert processing system 100.

The alert processing system 100 may be implemented as software stored on a non-transitory processor-readable medium and executed by the one or more processors 1402. For example, the processor-readable medium 1406 may store an operating system 1462, such as MAC OS, MS WINDOWS, UNIX, or LINUX, and code 1464 for the alert processing system 100. The operating system 1462 may be multi-user, multiprocessing, multitasking, multithreading, real-time, and the like. For example, during runtime, the operating system 1462 is running and the code for the alert processing system 100 is executed by the processor(s) 1402.

The computer system 1400 may include a data storage 1410, which may include a non-volatile data storage device. The data storage 1410 stores any data used by one or more of the alert processing system 100 100 and the transaction processing system 150. The data storage 1410 may be used to store the information received, the alerts generated along with the corresponding attributes, risk scores, information shared by the users, and other data generated and/or used during the operation.

The network interface 1404 connects the computer system 1400 to internal systems for example, via a LAN. Also, the network interface 1404 may connect the computer system 1400 to the Internet. For example, the computer system 1400 may connect to web browsers and other external applications and systems via the network interface 1404.

What has been described and illustrated herein is an example along with some of its variations. The terms, descriptions, and figures used herein are set forth by way of illustration only and are not meant as limitations. Many variations are possible within the spirit and scope of the subject matter, which is intended to be defined by the following claims and their equivalents.

What is claimed is:

1. A location-based alert processing system, comprising:
at least one data storage device that stores location data and date-time stamps of the location data of a client device, and
one or more processors executing machine-readable instructions stored in the at least one storage device to:
receive a risk alert issued by a remote data source regarding a risk assessment situation, where
the risk alert includes a risk score, location attributes, and time-related attributes associated with the risk assessment situation;
extract at least the risk score, the location attributes, and the time-related attributes from the risk alert;
determine a user-specific risk score based at least on the risk score of the risk alert, the location data, and the date-time stamps of the location data of the client device;
determine based at least on the user-specific risk score, if the risk alert is to be displayed or if the risk alert is to be deleted without being displayed to the user, where,
if it is determined that the risk alert is to be displayed,
display the risk alert on a display of the client device along with a feedback mechanism for further user action, and
if it is determined that the risk alert is to be deleted,
delete the risk alert without being displayed on the client device.

2. The location-based alert processing system of claim 1, where if the risk alert is displayed, the processors further execute instructions to:
receive user selection of a further user action via the feedback mechanism where the further user action includes contacting an emergency response center.

3. The location-based alert processing system of claim 1, where the processors further execute instructions to:
periodically poll a location-based alerts server for risk alert updates.

4. The location-based alert processing system of claim 1, where the processors further execute instructions to:
determine the user-specific risk score by weighing the risk score with factors indicative of a distance between the location data of the client device from the location attributes of the risk alert and time differences between the date-time stamps of the location data and the time-related attributes of the risk alert.

5. The location-based alert processing system of claim 4, where the processors further execute instructions to:
select a risk level associated with the user-specific risk score, wherein the risk level is selected from a plurality of risk levels where selecting at least one of the plurality of risk levels enables sharing the user-specific risk score with a trusted external party without sharing user identifying information.

6. The location-based alert processing system of claim 5, where to share the user-specific risk score the processors further execute instructions to:
receive user consent to share the user-specific risk score; and
share the user-specific risk score with the trusted external party upon receiving the user consent.

7. The location-based alert processing system of claim 1, where to determine the user-specific risk score the processors further execute instructions to:
determine a real-time, user-specific risk score for a user associated with the client device by weighing the risk score of the risk alert with a current speed of the client device, a current direction of travel of the client device relative to the location attributes, and the time-related attributes of the risk alert.

8. The location-based alert processing system of claim 7, where to determine the real-time risk score the processors further execute instructions to:
recalculate the risk score of the risk alert upon receiving input via the feedback mechanism that the user is impacted by the risk assessment situation.

9. The location-based alert processing system of claim 8, where the processors further execute instructions to:
display emergency instructions including evacuation routes and locations on the client device.

10. The location-based alert processing system of claim 1, where to determine the user-specific risk score the processors further execute instructions to:
receive future location data identifying one or more future locations of the client device and future temporal data associated with the future locations.

11. The location-based alert processing system of claim 10, where to determine the future risk score the processors further execute instructions to:
access a travel itinerary from a web browser; and
extract the future location data and the future temporal data from the travel itinerary.

12. The location-based alert processing system of claim 11, where the processors further execute instructions to:
share the future location data and the future temporal data from the travel itinerary with an external trusted party on receiving user consent;
receive the future risk score from the external trusted party in response to sharing the future location data and the future temporal data; and
display the future risk score with the travel itinerary in the web browser.

13. A method of processing location-based risk alerts, including:
validating information received regarding a risk assessment situation;
obtaining location attributes and time-related attributes associated with the risk assessment situation;
selecting at least one of a plurality of trained risk assessment models based on the risk assessment situation;
calculating using the at least one trained risk assessment model, a risk score associated with the risk assessment situation;
communicating a risk alert regarding the risk assessment situation to a plurality of client devices,
where the risk alert includes the location attributes, the time-related attributes, the risk score, and precautions to be followed based on the risk assessment situation;
enabling at the plurality of client devices receiving the risk alert, a determination regarding displaying the risk alert based at least on corresponding user-specific risk scores of the one or more client devices,
where the corresponding user-specific risk scores are generated using the risk score and corresponding location data stored on each of the plurality of client devices; and
causing a display of the risk alert with a feedback mechanism that enables user selection of a follow-up action, where the risk alert is displayed on each of the plurality of client devices based on comparisons of the corresponding user-specific risk scores with a predetermined risk threshold.

14. The method of claim 13, wherein if the risk alert is displayed further comprising:
receiving the user selection of the follow-up action that is indicative of a user associated with the client device being affected by an emergency pertaining to the risk assessment situation.

15. The method of claim 14, further comprising:
recalculating the risk score based on the indication of the user being affected by the risk assessment situation.

16. The method of claim 15, further comprising:
updating the risk alert communicated to the plurality of client devices to include the recalculated risk score.

17. The method of claim 13, further comprising:
training each of a plurality of machine learning (ML)-based risk assessment models on historical data to generate the plurality of trained risk assessment models, wherein the historical data for training each ML-based risk assessment model is associated with a particular risk assessment situation to generate a risk score for the particular risk assessment situation.

18. The method of claim 17, wherein selecting at least one of the plurality of trained risk assessment models further comprises:
determining a type of risk assessment situation by parsing and tokenizing the received information; and
selecting one or more of the plurality of trained risk assessment models based on the type of risk assessment situation.

19. A non-transitory processor-readable storage medium comprising machine-readable instructions that cause a processor to:
receive a risk alert transmitted by a remote data source regarding a risk assessment situation, where
the risk alert includes risk score, location attributes, and time-related attributes associated with the risk assessment situation;
extract at least the risk score, the location attributes, and the time-related attributes from the risk alert;
determine a user-specific risk score based at least on the risk score of the risk alert, stored location data, and date-time stamps of the location data;
determine based at least on a comparison of the user-specific risk score with a predetermined score threshold that the risk alert is to be displayed; and
display the risk alert along with a feedback mechanism for further user action.

20. The non-transitory processor-readable storage medium of claim 19, further comprising instructions that cause the processor to:
map the user-specific risk score with a risk level of a plurality of risk levels, where the mapped risk level suggests sharing the user-specific risk score and user identification information with a trusted external party.

* * * * *